(12) United States Patent
Lin et al.

(10) Patent No.: US 12,506,093 B2
(45) Date of Patent: Dec. 23, 2025

(54) BACK-END-OF-LINE COMPATIBLE PHYSICALLY UNCLONABLE FUNCTION MEMORY DEVICE AND SYSTEM

(71) Applicant: Taiwan Semiconductor Manufacturing Company, Ltd., Hsinchu (TW)

(72) Inventors: Meng-Han Lin, Hsinchu (TW); Chia-En Huang, Xinfeng (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 716 days.

(21) Appl. No.: 17/470,857

(22) Filed: Sep. 9, 2021

(65) Prior Publication Data

US 2022/0310537 A1 Sep. 29, 2022

Related U.S. Application Data

(60) Provisional application No. 63/166,038, filed on Mar. 25, 2021.

(51) Int. Cl.
| | |
|---|---|
| *H01L 23/00* | (2006.01) |
| *G11C 7/24* | (2006.01) |
| *G11C 17/04* | (2006.01) |
| *G11C 17/12* | (2006.01) |
| *H10B 20/00* | (2023.01) |
| *H10B 20/25* | (2023.01) |

(52) U.S. Cl.
CPC ............ *H01L 23/573* (2013.01); *G11C 7/24* (2013.01); *G11C 17/04* (2013.01); *G11C 17/12* (2013.01); *H10B 20/25* (2023.02); *H10B 20/27* (2023.02)

(58) Field of Classification Search
None
See application file for complete search history.

(56) References Cited

U.S. PATENT DOCUMENTS

| | | | | |
|---|---|---|---|---|
| 2007/0252209 A1* | 11/2007 | Yamazaki | ............. | H10B 69/00 257/E27.113 |
| 2011/0223731 A1* | 9/2011 | Chung | ................. | H10B 12/488 438/270 |
| 2018/0151224 A1* | 5/2018 | Chih | ................. | G11C 13/0007 |
| 2020/0044095 A1* | 2/2020 | Wang | ................ | H01L 29/66742 |
| 2022/0149046 A1* | 5/2022 | Karda | ................ | G11C 11/4085 |

\* cited by examiner

*Primary Examiner* — Sue A Purvis
*Assistant Examiner* — Seyon Ali-Simah Punchbeddell
(74) *Attorney, Agent, or Firm* — Foley & Lardner LLP

(57) ABSTRACT

A memory system includes a memory array comprising a plurality of memory cells. Each of the memory cells includes a transistor coupled to a first capacitor and a second capacitor in series, respectively. The memory system includes an authentication circuit operatively coupled to the memory array. The authentication circuit is configured to generate a Physically Unclonable Function (PUF) signature based on respective logic states of the plurality of memory cells, and wherein the logic state of each of the plurality of memory cells is determined based on a preceding breakdown of either the corresponding first capacitor or second capacitor.

18 Claims, 19 Drawing Sheets

BACK-END-OF-LINE COMPATIBLE PHYSICALLY UNCLONABLE FUNCTION MEMORY DEVICE AND SYSTEM

CROSS-REFERENCE TO RELATED APPLICATION

This application claims priority to and the benefit of U.S. Provisional Application No. 63/166,038, filed Mar. 25, 2021, entitled "BACK-END-OF-LINE COMPATIBLE PHYSICALLY UNCLONABLE FUNCTION MEMORY DEVICE," which is incorporated herein by reference in its entirety for all purposes.

BACKGROUND

With the increasing use of electronic devices utilizing integrated circuits to provide different types of information for a variety of different applications, there has been an increasing need to adequately protect sensitive and/or critical information that may be stored within an electronic device to limit access to such information to only the devices that have permission to access the information. Some examples of applications include the authentication of devices, protection of confidential information within a device, and securing a communication between two or more devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
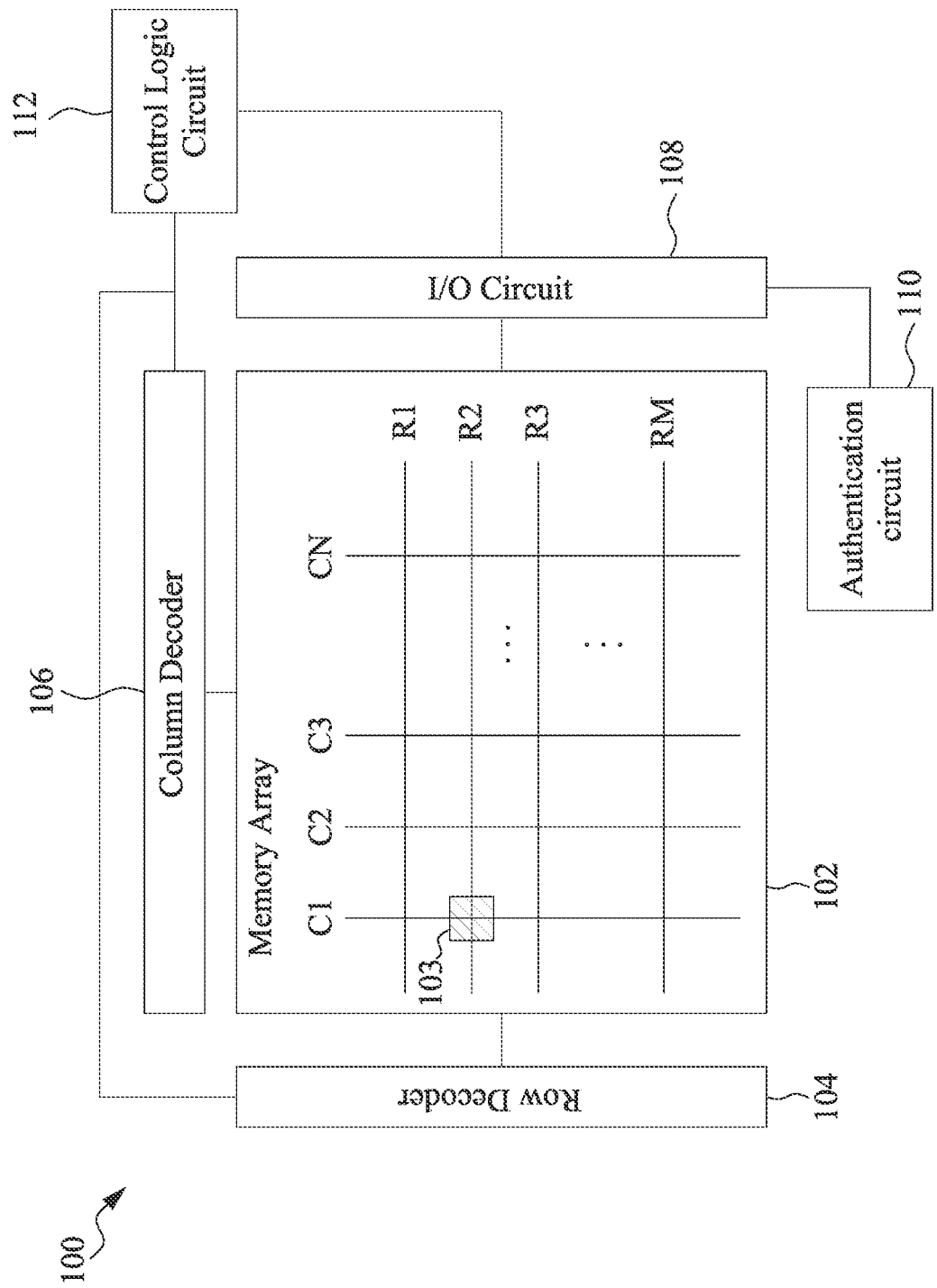
FIG. 1 illustrates a block diagram of an example memory system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A physically unclonable function (PUF) is generally used for authentication and secret key storage without requiring secure electrically erasable programmable read-only memory (EEPROMs) and/or other expensive hardware (e.g., battery-backed static random-access memory). Instead of storing secrets in a digital memory, the PUF derives a secret from physical characteristics of an integrated circuit (IC). The PUF is based on an idea that even though an identical manufacturing process is used to fabricate a number of ICs, each IC may be slightly different from one another due to manufacturing variability. PUFs leverage this variability to derive "secret" information that is unique to each of the ICs (e.g., a silicon biometric). Generally, such secret information is referred to as a "PUF signature" of the IC. In addition, due to the manufacturing variability that defines the PUF signature, one cannot manufacture two identical ICs even with full knowledge of the IC's design. Various types of variability of an IC can be used to define such a signature such as, for example, gate delay(s), power-on state(s) of a memory device, and/or any of a variety of physical characteristics of an IC.

Embodiments of the present disclosure provide various systems and methods to generate, at least, a bit of a PUF signature (sometimes referred to as a PUF bit) for a memory device that includes a number of memory cells, each of which includes a pair of capacitors. Even though the pair of capacitors are formed in the same dimensions and the same material, while being concurrently with the same level of a programming voltage, one of the capacitors can precede the other to be broken down by the programming voltage, according to various embodiments. Based on determining which of the capacitors is broken down first, the disclosed system, which is integrated with the memory device, can generate one PUF bit for the memory device. Applying the same principle over all of the memory cells, the disclosed system can generate a unique PUF signature for the particular memory device. Further, the present disclosure provides various embodiments of methods to fabricate such a memory device in a high density for generating a sufficient number of PUF bits, which advantageously avoid the memory device from being tampered or otherwise unauthentically accessed.

FIG. 1 illustrates a memory system 100, in accordance with various embodiments. In the illustrated embodiment of FIG. 1, the memory system 100 includes a memory array 102, a row decoder 104, a column decoder 106, an input/output (I/O) circuit 108, an authentication circuit 110, and a control logic circuit 112. Despite not being shown in FIG. 1, all of the components of the memory system 100 may be coupled to each other and to the control logic circuit 112. Although, in the illustrated embodiment of FIG. 1, each component is shown as a separate block for the purpose of clear illustration, in some other embodiments, some or all of the components shown in FIG. 1 may be integrated together. For example, the memory array 102 may include an embedded authentication circuit (e.g., 110).

The memory array 102 is a hardware component that stores data. In one aspect, the memory array 102 is embodied as a semiconductor memory device. The memory array 102 includes a plurality of memory cells (or otherwise storage units) 103. The memory array 102 includes a number of rows $R_1, R_2, R_3 \ldots R_M$, each extending in a first direction (e.g., X-direction) and a number of columns $C_1, C_2, C_3 \ldots C_N$, each extending in a second direction (e.g., Y-direction). Each of the rows/columns may include one or more conductive structures. In some embodiments, each memory cell 103 is arranged in the intersection of a corresponding row and a corresponding column, and can be operated according to voltages or currents through the respective conductive structures of the column and row.

In some embodiments, each memory cell 103 includes a transistor coupled to a pair of capacitors in series. The transistor can be turned on/off to enable/disable an access (e.g., program, read) to the capacitors. For example, upon being enabled, those two capacitors can be programmed at the same time. Randomly, one of the capacitors can be broken down faster than the other, and consequently, a logic state of the memory cell can be determined based on which of the two capacitors has been broken down. Such randomly determined logic states of the memory cells can constitute the basis of a PUF signature. Detailed descriptions on configurations and operations of the memory cell 103 and its application to generate a PUF signature will be discussed below with respect to FIGS. 2 through 4.

The row decoder 104 is a hardware component that can receive a row address of the memory array 102 and assert a conductive structure (e.g., a word line) at that row address. The column decoder 106 is a hardware component that can receive a column address of the memory array 102 and assert one or more conductive structures (e.g., a pair of source lines) at that column address. The I/O circuit 108 is a hardware component that can access (e.g., read, program) each of the memory cells 103 asserted through the row decoder 104 and column decoder 106. The authentication circuit 110 is a hardware component that can generate a PUF signature based on respective logic states of the memory cells read by the I/O circuit 108. The control logic circuit 112 is a hardware component that can control the coupled components (e.g., 102 through 110). Detailed descriptions on configurations and operations of memory system 100 are provided below with respect to FIGS. 2 through 4.

Figure 2:
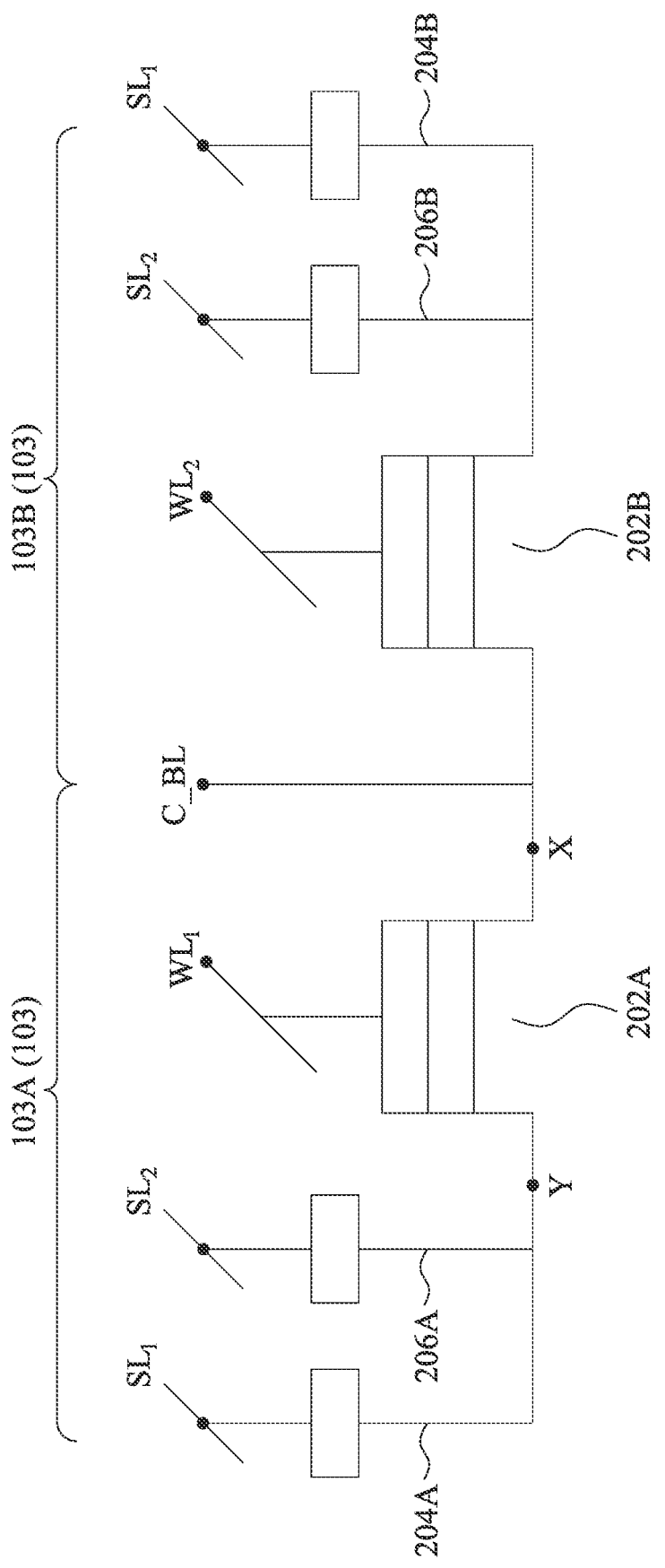
FIG. 2 illustrates a circuit diagram of a number of adjacent memory cells of the memory system of FIG. 1, in accordance with some embodiments.

FIG. 2 illustrates an example circuit diagram of the memory cell 103, in accordance with various embodiments. Two memory cells, 103A and 103B, are shown in FIG. 2. In one embodiment, these two memory cells 103A and 103B may be arranged in one of the columns and in respective two rows of the rows of the memory array 102 (FIG. 1). In another embodiment, these two memory cells 103A and 103B may be arranged in one of the rows and in respective two columns of the rows of the memory array 102 (FIG. 1), which will be discussed in further detail below.

Each of the memory cells 103 has one transistor serially coupled to two capacitors, in various embodiments. For example, the memory cell 103A has a transistor 202A, and capacitors 204A and 206A, in which the transistor 202A is coupled to the capacitors 204A and 206A, respectively, in series; and the memory cell 103B has a transistor 202B, and capacitors 204B and 206B, in which the transistor 202B is coupled to the capacitors 204B and 206B, respectively, in series. Specifically, the transistors 202A and 202B each have a first drain/source terminal (e.g., denoted as node "X" in FIG. 2) commonly connected to a first access line, (e.g., a bit line, hereinafter "common bit line (C_BL)"), and each have a second source/drain terminal (e.g., denoted as node "Y" in FIG. 2) connected to the respective pair of capacitors. Such a second source/drain terminal of the transistor 202A is connected to respective first terminals of the capacitors 204A and 206A, with their second terminals connected to second and third access lines, respectively (e.g., source lines, hereinafter "$SL_1$" and "$SL_2$"); and such a second source/drain terminal of the transistor 202B is connected to respective first terminals of the capacitors 204B and 206B, with their second terminals connected to the same second access line ($SL_1$) and third access line ($SL_2$), respectively. Further, the transistors 202A and 202B are connected to a fourth word line (e.g., a word line, hereafter "$WL_1$") and a fifth word line (e.g., a word line, hereafter "$WL_2$"), respectively, and controlled (e.g., gated) by these two $WL_1$ and $WL_2$, respectively.

Interposed between the first and second terminals of each of the capacitors (e.g., 204A-B, 206A-B), a dielectric film is present. Example materials of the dielectric film include, but are not limited to, silicon oxide, silicon dioxide, aluminum oxide, hafnium oxide, tantalum oxide, ZrO, TiO2, HfOx, a high-k dielectric, or the like. Examples of high-k dielectrics include, but are not limited to, zirconium dioxide, hafnium dioxide, zirconium silicate, hafnium silicate, or the like. In at least one embodiment, the transistor and the pair of capacitors of each of the memory cells 103 are formed over a semiconductor substrate in a back-end-of-line (BEOL) processing, which allows fabrication of the disclosed memory system 100 to be compatible with existing complementary metal-oxide-semiconductor (CMOS) processing technologies. Further example structures and example manufacturing processes of the disclosed memory cell 103, in accordance with some embodiments, will be described with respect to FIGS. 7 through 18.

In accordance with various embodiments of the present disclosure, each of the memory cells 103 can be accessed through turning on its corresponding transistor. In response to being turned on, the capacitors are concurrently applied with a relatively high level of a voltage (sometimes referred to as a programming voltage). Due to processing variability, even though those two capacitors are formed of the same materials (e.g., the same dielectric film) and made in identical dimensions, the dielectric film of one of the two capacitors should be broken down faster than the dielectric film of the other capacitor. Upon a breakdown occurs to one of the two capacitors, a sudden increase of voltage can be present on the common node (e.g., node Y of FIG. 2) connected between the capacitors and the transistor. Consequently, the memory cell can be "randomly" programmed to a first logic state or a second logic state. Whether the first or second logic state is programmed into the memory cell can correspond to which of the capacitors is broken down first, which may be determined based on a further read process. For example, by concurrently applying a relatively low level of a voltage (sometimes referred to as a reading voltage) on the two capacitors, an observable decrease of reading voltage may be present on the broken-down capacitor, while the reading voltage applied on the non-broken-down capacitor may remain substantially unchanged. Based on such a randomly programmed logic state on each of the memory cells, a PUF signature can be generated.

Figure 3:
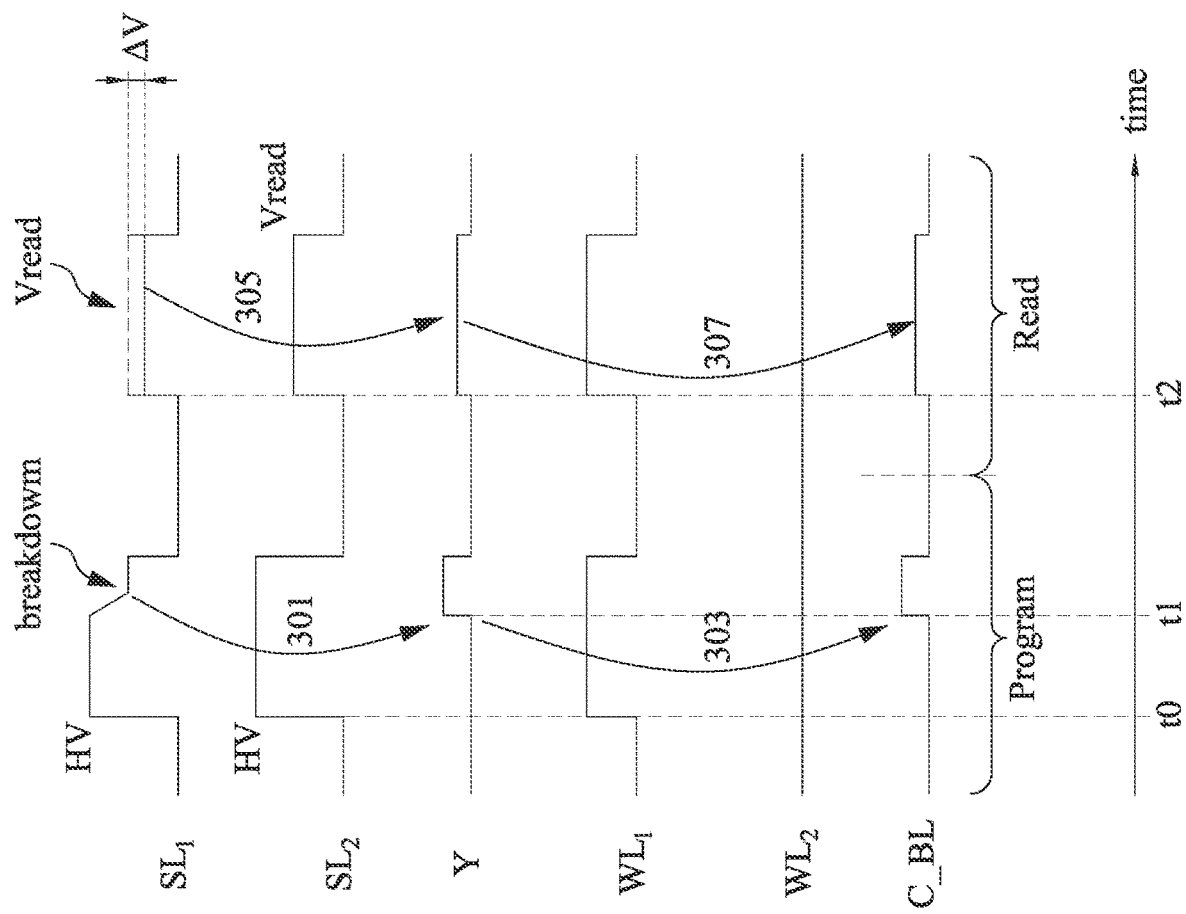
FIG. 3 illustrates example waveforms of a number of signals present on or applied to the memory cells of FIG. 2, in accordance with some embodiments.

FIG. 3 illustrates example waveforms of various signals applied to or present on one or more of the memory cells (e.g., 103A, 103B of FIG. 2), in accordance with various embodiments. For example, such signals include: a voltage signal applied on the $SL_1$, a voltage signal applied on the $SL_2$; a voltage signal present on the node Y; a voltage signal applied on the $WL_1$; a voltage signal applied on the $WL_2$; and a voltage signal present on the C_BL. The waveforms of these signals change over time for at least a program process and a read process, as indicated in FIG. 3. Operations of the program and read processes are performed by one or more components of the memory system 100 (FIG. 1), and thus, the following discussions may sometimes refer to the components of FIG. 1.

In the example of FIG. 3, the memory cell 103A is selected and the memory cell 103B is unselected for programming. To select the memory cell 103A for programming, the I/O circuit 108 (FIG. 1) can provide a high enough voltage (a logic high voltage) to be applied on the $WL_1$ (thus turning on the transistor 202A) through the row decoder 104 and column decoder 106, while providing a logic low voltage to be applied on the $WL_2$ (thus turning off the transistor 202B), as indicated in FIG. 3. It should be appreciated that although the transistor 202A is turned on at this stage, C_BL is applied with a logic low voltage and neither the capacitor 204A nor 206A has been broken down. So, the signal at the node Y remains at a logic low state.

Next, in response to turning on the transistor 202A, the I/O circuit 108 can concurrently provide a relatively high voltage (HV) to be applied on the $SL_1$ and $SL_2$ for programming the transistor 202A. After applying the HV for a certain period of time, one of the capacitors (e.g., 204A) is broken down, which can suddenly pull down the signal present on the $SL_1$ that connected to the broken down capacitor 204A, as indicated by "breakdown" in FIG. 3. Occurrence of the breakdown can allow some of the voltage applied on the $SL_1$ to be seen on the node Y through the broken down capacitor 204A, as indicated by symbolic arrow 301. The voltage signal at the node Y may have a sudden increase, which can cause the voltage signal present on the C_BL to have a sudden increase accordingly (through the turned-on transistor 202A), as indicated by symbolic arrow 303.

In some embodiments, the I/O circuit 108 can detect such a sudden increase of voltage signal present on the node Y and/or the C_BL. According to detecting the sudden increase, the control logic circuit 112 (FIG. 1), operatively coupled to the I/O circuit 108, can determine that the selected memory cell has been successfully and randomly programed into a logic state.

Next, the I/O circuit 108 concurrently provide a relatively low voltage (Vread), compared to the HV, to be applied on the $SL_1$ and $SL_2$ for reading the transistor 202A. As the capacitor 204A has been broken down (and the capacitor 206A remains substantially intact), a voltage decrease ($\Delta V$) is present on the $SL_1$, while the voltage signal present on the $SL_2$ remains substantially similar to Vread. The I/O circuit 108 can detect such a voltage decrease present on one of the $SL_1$ and $SL_2$, which allows the control logic circuit 112 to determine which of the capacitors 204A and 206A has been broken down. For example, when $\Delta V$ is present on the $SL_1$, the control logic circuit 112 can determine that the capacitor 204A, connected to the $SL_1$, has been broken down; and when $\Delta V$ is present on the $SL_2$, the control logic circuit 112 can determine that the capacitor 206A, connected to the $SL_2$, has been broken down. Similar as the program process, the decrease of voltage on one of the $SL_1$ and $SL_2$ can reflect on the node Y (symbolic arrow 305) and then C_BL (symbolic arrow 307).

Upon determining which of the capacitors of the selected memory cell has been broken down, the control logic circuit 112 can determine the logic state "randomly" programmed into the memory cell. For example, when the capacitor connected to the $SL_1$ has been broken down, the control logic circuit 112 can determine the programmed logic state as a logic 0; and when the capacitor connected to the $SL_2$ has been broken down, the control logic circuit 112 can determine the programmed logic state as a logic 1. The control logic circuit 112 can provide such a logic state to the authentication circuit 110 for generating one bit of a PUF signature (a PUF bit). In some embodiments, the control logic circuit 112 can provide a logic state of each of the remaining memory cells one-by-one to the authentication circuit 110 for gradually building up the bits of the PUF signature. In some other embodiments, the control logic circuit 112 can provide logic states of all the memory cells as a whole to the authentication circuit 110 for generating the bits of the PUF signature.

Figure 4:
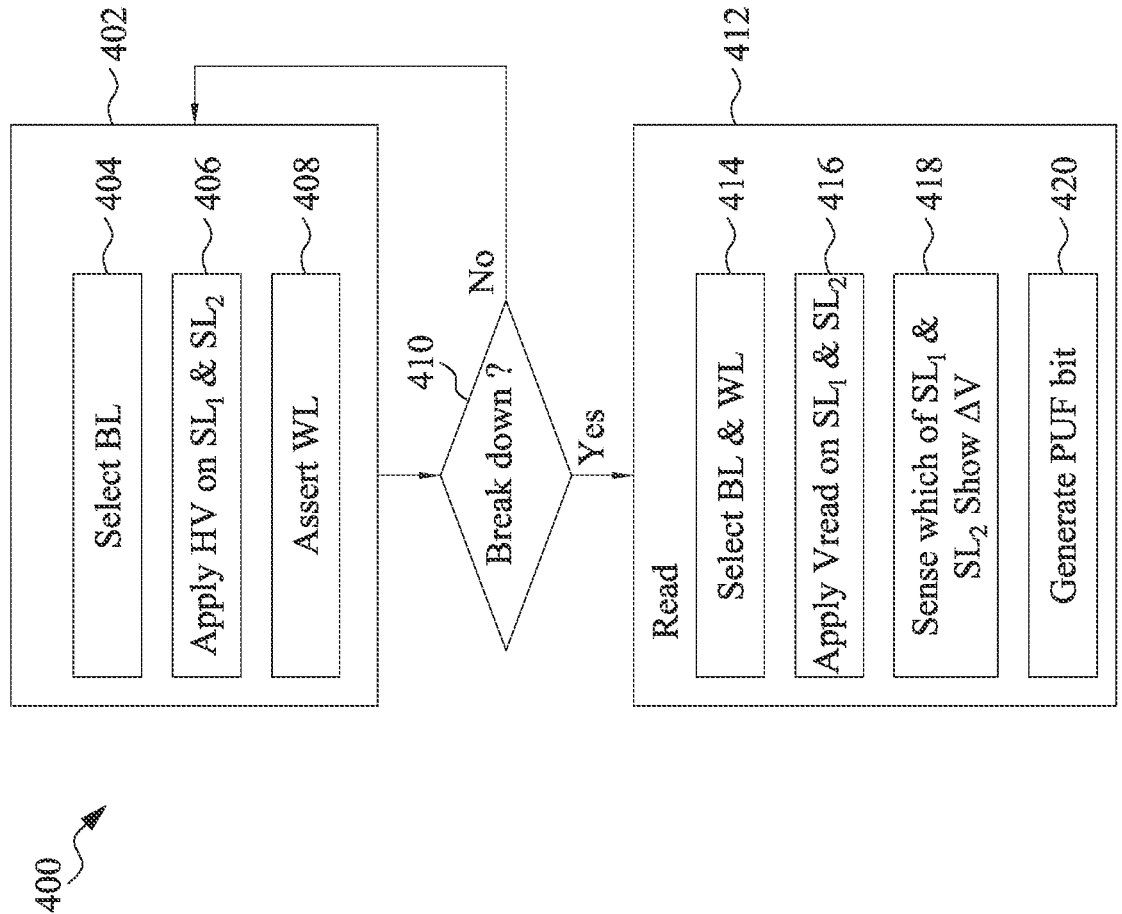
FIG. 4 illustrates a flow chart of a method to operate the memory cell of the memory system of FIG. 1, in accordance with some embodiments.

FIG. 4 illustrates an exemplary flow chart of a method 400 of generating a physically unclonable function (PUF) signature based on a memory cell formed by a transistor and a pair of capacitors, in accordance with various embodiments. Operations of method 400 are performed by one or more components illustrated in FIGS. 1-3. For purposes of discussion, the following embodiment of the method 400 will be described in conjunction with FIGS. 1-3. The illustrated embodiment of the method 400 is merely an example so that any of a variety of operations may be omitted, re-sequenced, and/or added, while remaining within the scope of the present disclosure.

The method 400 starts at operation 402 of a program process. Specifically, operation 402 includes operation 404 in which a BL is selected, operation 406 in which $SL_1$ and $SL_2$ are concurrently applied with a high programming voltage (HV), and operation 408 in which a WL is asserted. It should be noted the sequence of operations 404 to 408 can be changed, while remaining within the scope of present disclosure. For example, operation 408 may be performed prior to operations 404 and 406.

Referring first to operation 404, the control logic circuit 112 can provide a column address for the column decoder 106 to select one of the columns $C_1$ to $C_N$ of the memory array 102. Upon selecting a column, the I/O circuit 108 can provide a voltage (e.g., a logic low voltage) to a BL arranged in the selected column, e.g., C_BL of FIG. 2. Referring next to operation 406, based on the selected column, the I/O circuit 108 can provide the HV to the $SL_1(s)$ and $SL_2(s)$ arranged in the selected column, e.g., both of the $SL_1$ and both of the $SL_2$ of FIG. 2. Referring then to operation 408, the control logic circuit 112 can provide a row address for the row decoder 104 to select one of the rows $R_1$ to $R_M$ of the memory array 102. Upon selecting a row, the I/O circuit 108 can provide a voltage (e.g., a logic high voltage) to a WL arranged in the selected row, e.g., $WL_1$ of FIG. 2. As such, the memory cell arranged in the intersection of the selected column and row (e.g., 103A) can be programmed.

Next, the method 400 proceeds to operation 410 to determine whether or not one of the capacitors of the selected memory cell has been broken down (i.e., programmed). If so, the method 400 proceeds to operation 412 of a read process; and if not, the method 400 proceeds back to operation 402 to perform the program process again. In various embodiments, the I/O circuit 108 can determine whether the breakdown occurs to one of the capacitors based on detecting a voltage increase present on a node commonly connected between the pair of capacitors and the transistor of the selected memory cell and/or on the selected BL, as discussed with respect to FIG. 3 (e.g., 301, 303).

Operation 412 further includes operation 414 in which BL and WL are selected, operation 416 in which $SL_1$ and $SL_2$ are concurrently applied with a relatively low read voltage (Vread), operation 418 to sense which of the $SL_1$ and $SL_2$ shows a signal decrease (e.g., $\Delta V$), and operation 420 in which a PUF bit is generated.

Referring first to operation 414, the control logic circuit 112 can provide a column address for the column decoder 106 to select one of the columns $C_1$ to $C_N$ of the memory array 102, and provide a row address for the row decoder 104 to select one of the rows $R_1$ to $R_M$ of the memory array 102. In some embodiments, the column and row asserted in operation 414 may be the same as the column asserted in operation 404 and the row asserted in operation 408, respectively. Referring next to operation 416, based on the selected column, the I/O circuit 108 can provide the Vread to the $SL_1$(s) and $SL_2$(s) arranged in the selected column, e.g., both of the $SL_1$ and both of the $SL_2$ of FIG. 2; and based on the selected row, the I/O circuit 108 can provide a logic high voltage to the WL arranged in the selected row, e.g., $WL_1$ of FIG. 2. Thus, only the memory cell 103A can be read. Next in operation 418, the I/O circuit 108 can sense which of the $SL_1$ and $SL_2$, connected to the memory cell 103A, shows a signal drop (e.g., $\Delta V$ discussed with respect to FIG. 3). Consequently, the control logic circuit 112 can determine the logic state programmed into the memory cell 103A based on whether it is $SL_1$ or $SL_2$ that has the signal drop, and provide such a logic state to the authentication circuit 110 to generate a PUF bit (operation 420).

Figure 5:
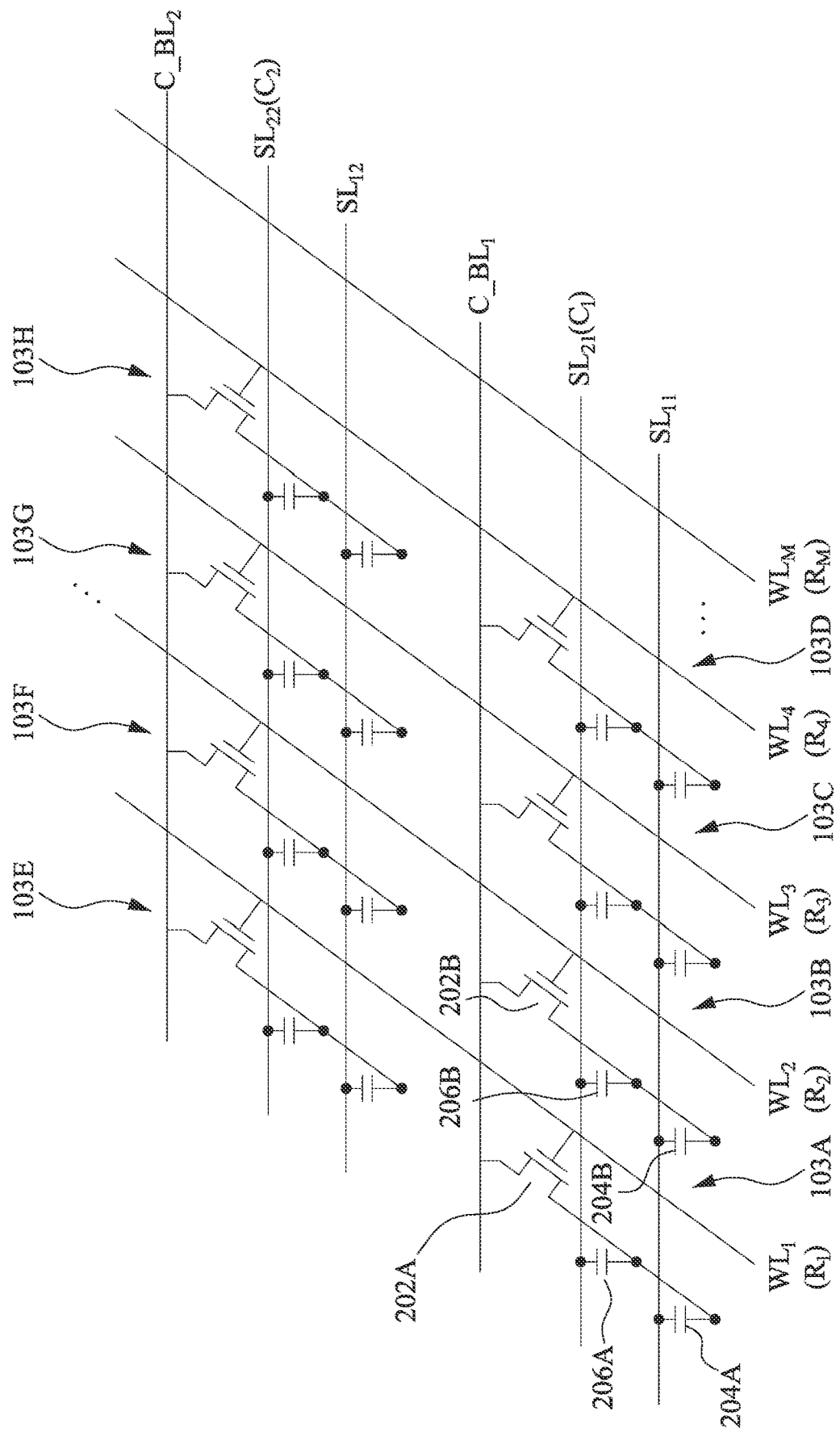
FIG. 5 illustrates a circuit diagram of a memory array of the memory system of FIG. 1, in accordance with some embodiments.

FIG. 5 illustrates an example circuit diagram of a portion of the memory array 102 (FIG. 1), in accordance with various embodiments. In the illustrated example of FIG. 5, eight memory cells, 103A, 103B, 103C, 103D, 103E, 103F, 103G, and 103H, of the memory array 102 are shown. However, it should be appreciated that the memory array 102 can have any number of memory cells, while remaining within the scope of present disclosure.

As mentioned above with respect to FIG. 1, the memory cells 103 of the memory array 102 are formed as an array, in which the memory cells are arranged over a number of columns and a number of rows. For example, a subset of the memory cells are arranged along one of the rows, and each of the subset of memory cells is arranged along a respective column. Alternatively stated, each of the memory cells is arranged at the intersection of a column and a row.

In the example of FIG. 5, the memory cell 103A (similar to the memory cell 103A shown in FIG. 2) is arranged at the intersection of a first column $C_1$ and a first row $R_1$; the memory cell 103B (similar to the memory cell 103B shown in FIG. 2) is arranged at the intersection of the first column $C_1$ and a second row $R_2$; the memory cell 103C is arranged at the intersection of the first column $C_1$ and a third row $R_3$; the memory cell 103D is arranged at the intersection of the first column $C_1$ and a fourth row $R_4$; the memory cell 103E is arranged at the intersection of a second column $C_2$ and the first row $R_1$; the memory cell 103F is arranged at the intersection of the second column $C_2$ and the second row $R_2$; the memory cell 103G is arranged at the intersection of the second column $C_2$ and the third row $R_3$; and the memory cell 103H is arranged at the intersection of the second column $C_2$ and the fourth row $R_4$. The first column $C_1$ includes a common bit line $C\_BL_1$, a first source line $SL_{11}$, and a second source line $SL_{21}$; the second column $C_2$ includes a common bit line $C\_BL_2$, a first source line $SL_{12}$, and a second source line $SL_{22}$; the first row $R_1$ includes a word line $WL_1$; the second row $R_2$ includes a word line $WL_2$; the third row $R_3$ includes a word line $WL_3$; the fourth row $R_4$ includes a word line $WL_4$ More specifically, the word line (e.g., $WL_1$, $WL_2$, $WL_3$, $WL_4$) in each row is commonly connected to the gate terminal of a respective transistor of each of the memory cells in that row; the common bit line (e.g., $C\_BL_1$, $C\_BL_2$) in each column is commonly connected to one of the source/drain terminals of a respective transistor of each of the memory cells in that column; the first source line (e.g., $SL_{11}$, $SL_{12}$) in each column is commonly connected to one of the terminals of a respective first capacitor of each of the memory cells in that column; and the second source line (e.g., $SL_{21}$, $SL_{22}$) in each column is commonly connected to one of the terminals of a respective second capacitor of each of the memory cells in that column. For example, gate terminals of the transistor 202A of the memory cell 103A and the transistor 202B of the memory cell 103B are connected to $WL_1$ and $WL_2$, respectively; one source/drain terminal of each of the transistors 202A and 202B is commonly connected to $C\_BL_1$ (with the other source/drain terminal connected to a respective pair of capacitors, e.g., (206A and 204A), (206B and 204B)); one terminal of each of the capacitors 206A and 206B is commonly connected to $SL_{21}$ (with the other terminal connected to the corresponding transistor); and one terminal of each of the capacitors 204A and 204B is commonly connected to $SL_{11}$ (with the other terminal connected to the corresponding transistor).

It should be noted that the bit/source lines are not necessarily disposed in the column of a memory array, neither are the word lines disposed in the row of a memory array. For example, in some other embodiments, the common bit line and the pair of source lines may be disposed along a corresponding one of a number of rows of a memory array and the word line may be disposed along a corresponding one of a number of columns of the same memory array, while remaining within the scope of present disclosure.

Figure 6A:
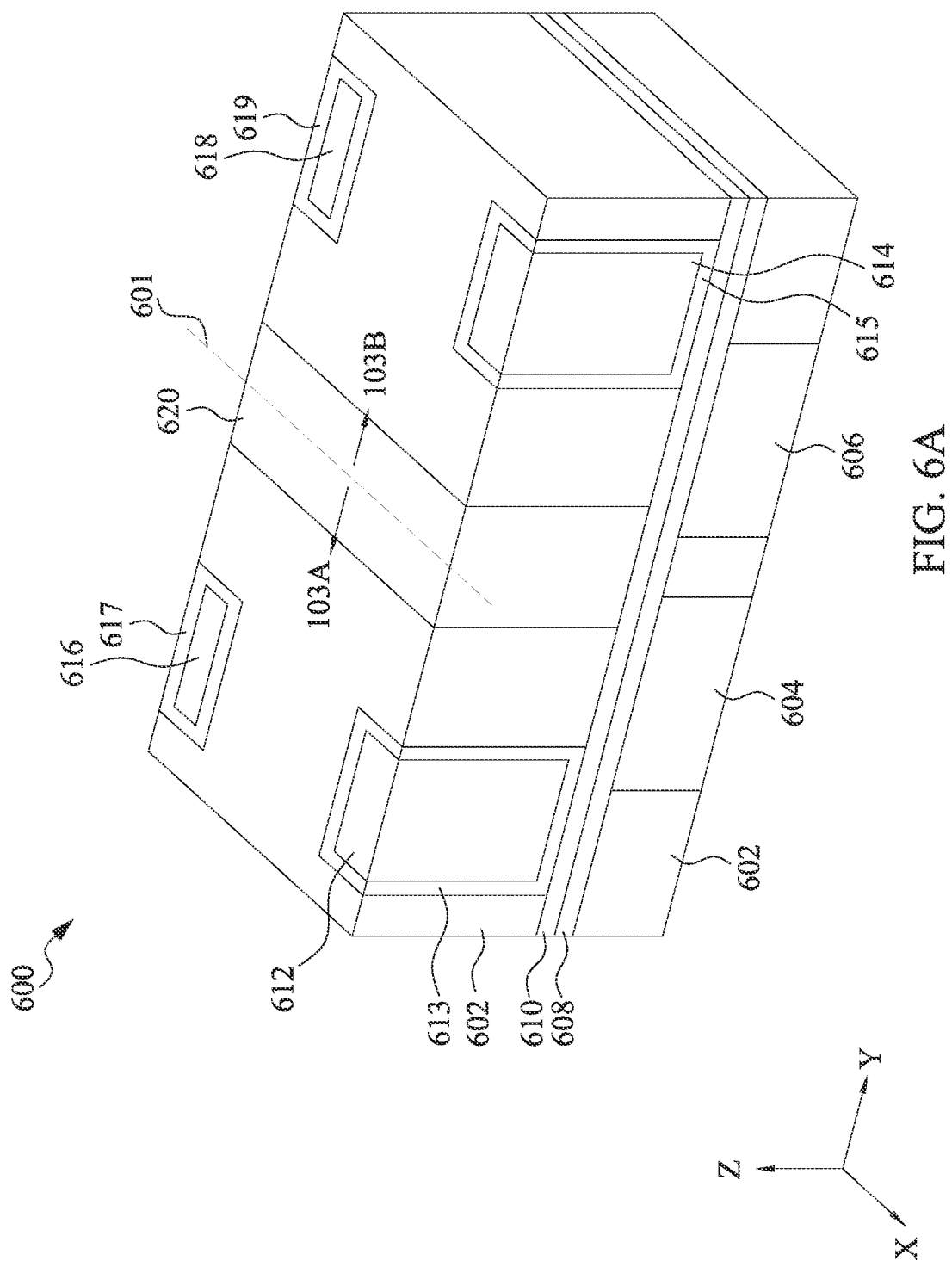
FIG. 6A illustrates a perspective view of an example memory device including the memory cells of FIG. 2, in accordance with some embodiments.
Figure 6B:
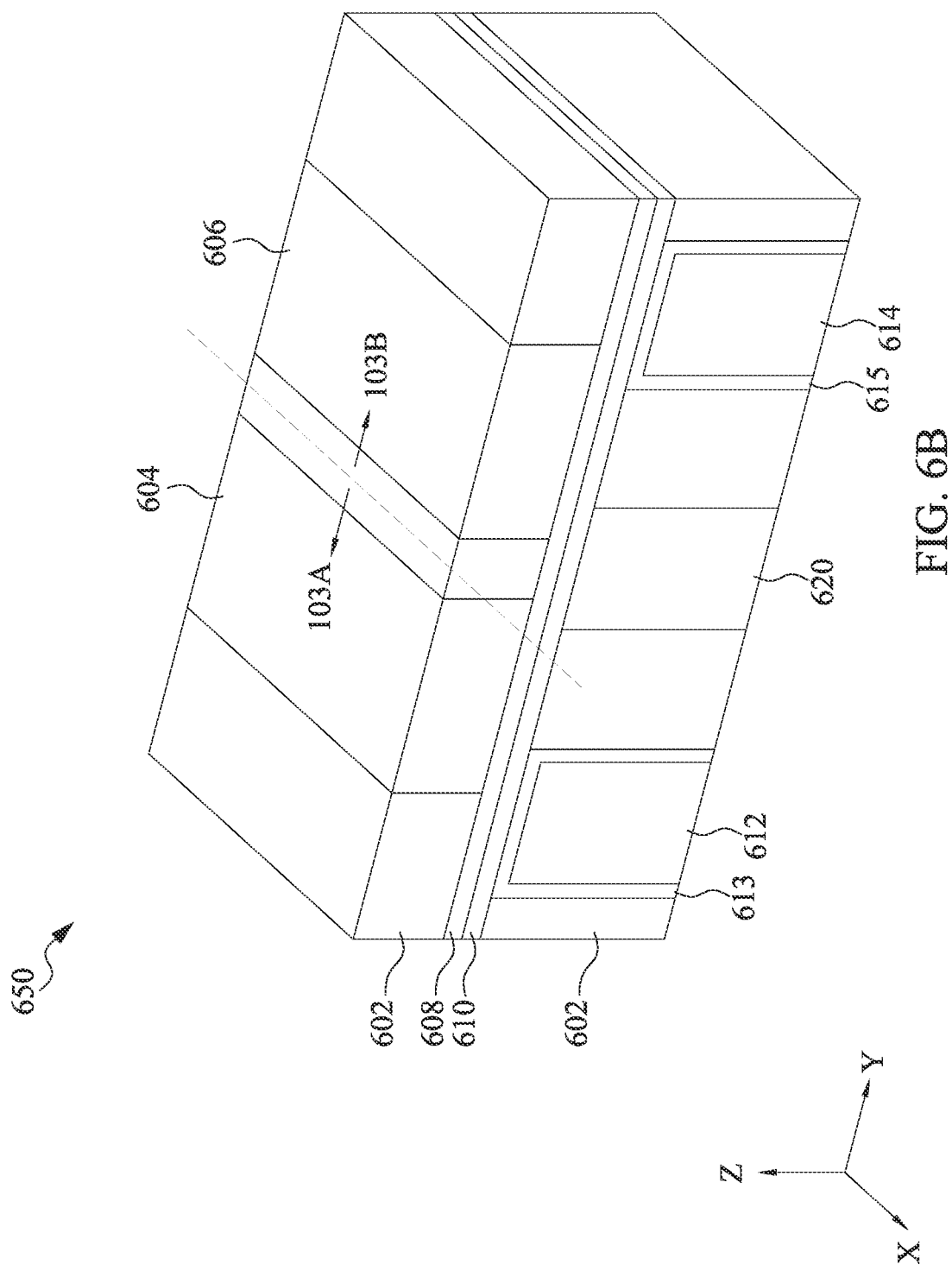
FIG. 6B illustrates a perspective view of another example memory device including the memory cells of FIG. 2, in accordance with some embodiments.

FIG. 6A illustrates a perspective view of an example memory device 600 that includes a number of the disclosed memory cells 130 discussed above. For example, the memory device 600 includes memory cells 130A and 130B, that are arranged over two rows and one column of a memory array (FIG. 5). FIG. 6B illustrates a perspective view of another example memory device 650 that includes a number of the disclosed memory cells 130. The memory devices 600 and 650 are substantially similar to each other, except for the relative vertical configurations of some of their components, which will be discussed in further detail below.

Referring first to FIG. 6A, the memory device 600 includes a first insulation layer 602, with two metal structures 604 and 606 respectively traversing across the first insulation layer 602 along a lateral direction (e.g., X direction). Such two metal structures 604 and 606 are in parallel with and separated apart (isolated) from each other. Over the metal structures 604 and 606, a gate dielectric layer 608 is disposed, which is further overlaid by a semiconductor film 610. Over the semiconductor film 610, a second insulation layer 602 is disposed. Embedded within such a second insulation layer 602, a number of conductive structures 612, 614, 616, 618, and 620 are formed. Each of the conductive structures 612 to 620 can extend along a vertical direction (e.g., the Z direction) with a certain height, for example, about equal to a thickness of the second insulation layer 602. In addition, the conductive structure 620 may laterally traverse across a middle portion of the second insulation layer 602 (e.g., along the X direction), while the conductive structures 612 to 618 are each disposed around one of the corner portions of the second insulation layer 602. The memory device 600 further includes dielectric films 613, 615, 617, and 619. Each of the dielectric films may be interposed between a respective one of the conductive structures 612 through 618 and the second insulation layer 602. For example, while being embedded within the second insulation layer 602, the dielectric film 613 can wrap (e.g., contact) a bottom surface and sidewalls of the conductive structure 612, with its top surface exposed for further connection.

According to some embodiments of present disclosure, referring again to FIG. 5, the metal structures 604 and 606 can serve as the $WL_1$ and $WL_2$ that gate the transistor 202A of the memory cell 103A and the transistor 202B of the memory cell 103B, respectively. Alternatively stated, the metal structures 604 and 606 may function as the gate terminals of the transistors 202A and 202B, respectively. A gate dielectric and a channel of the transistor 202A can be formed by a first portion (e.g., the left portion with respect to dotted line 601) of the gate dielectric layer 608 and a first portion (e.g., the left portion with respect to dotted line 601) of the semiconductor film 610, respectively; and a gate dielectric and a channel of the transistor 202B can be formed by a second portion (e.g., the right portion with respect to dotted line 601) of the gate dielectric layer 608 and a second portion (e.g., the right portion with respect to dotted line 601) of the semiconductor film 610, respectively.

Further, a middle (or common) portion of the semiconductor film 610 is in contact with the conductive structure 620, which can function as the $C\_BL_1$. The first (left) portion of the semiconductor film 610 is coupled to the conductive structures 612 and 616, which can function as (connect to) the $SL_{11}$ and $SL_{21}$, respectively; and the second (right) portion of the semiconductor film 610 is coupled to the conductive structures 614 and 618, which can function as (or connect to) the $SL_{11}$ and $SL_{21}$, respectively. Accordingly, the dielectric films 613 and 617 can serve as the "broken-downable" dielectric films of the capacitors 204A and 206A, respectively; and the dielectric films 615 and 619 can serve as the "broken-downable" dielectric films of the capacitors 204B and 206B, respectively. In some embodiments, the conductive structures 612, 614, 616, and 618 can each serve as one terminal of a respective one of the capacitors 204A, 204B, 206A, and 206B, while the other (e.g. virtual) terminal of each of the capacitors may be formed by a portion of the semiconductor channel 610 coupled to (e.g., vertically disposed below) the corresponding one of conductive structures 612 to 618.

Referring then to FIG. 6B, the memory device 650 is substantially similar to the memory device 600. For example, the metal structures 604-606 are disposed opposite the gate dielectric layer 608/semiconductor film 610 from the conductive structures 612-620. However, the conductive structures 612 to 620 may be first formed within an insulation layer 602. Over the conductive structures 612 to 620, the semiconductor film 610 and the gate dielectric layer 608 are sequentially formed. Over the gate dielectric layer 608, the metal structures 604 and 606 are then formed within another insulation layer 602. Respective functionalities of the components of memory device 650 should be the same as memory device 600 (as discussed with respect to FIG. 6A), and thus, the discussions are not repeated.

Figure 7:
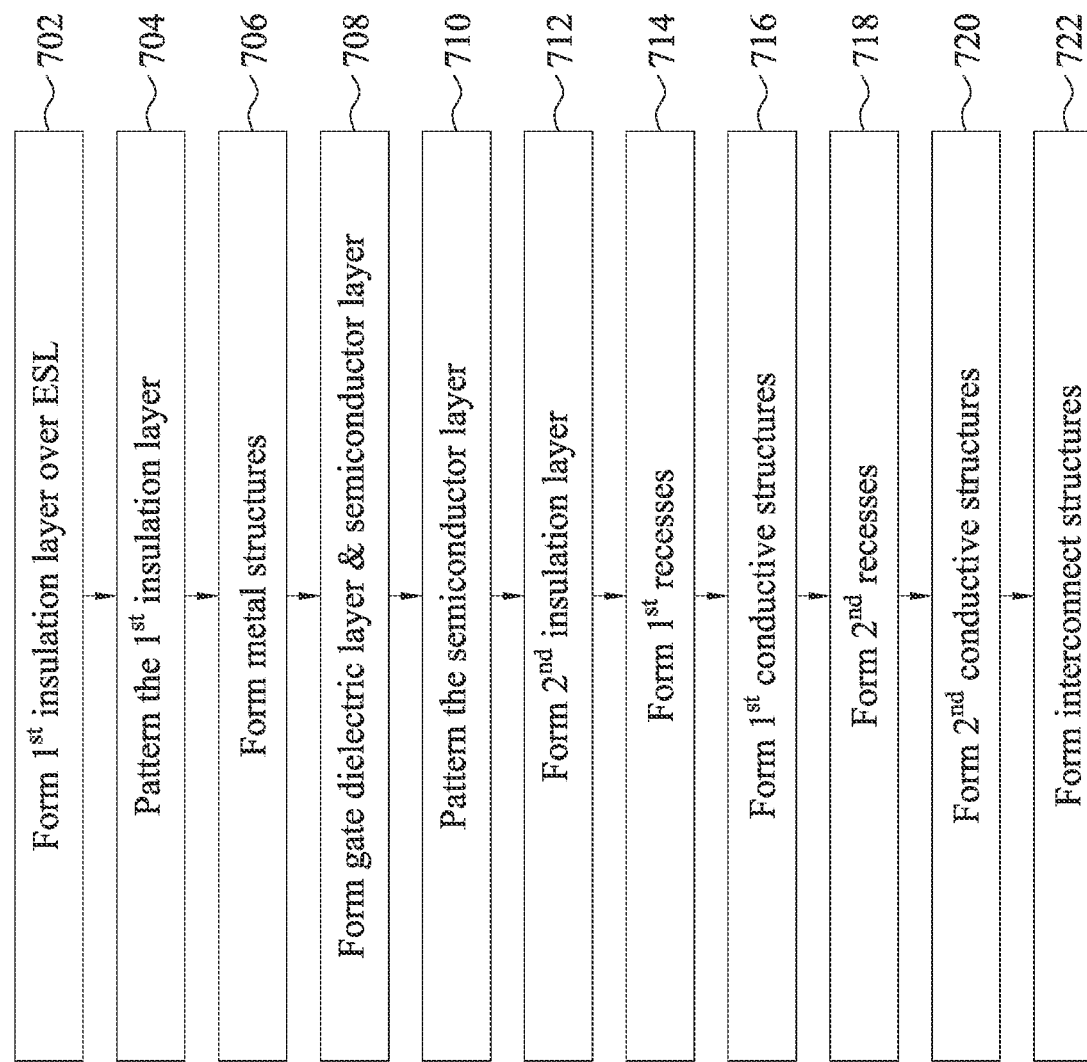
FIG. 7 illustrates a flow chart of an example method for making a memory device including the memory array of FIG. 5, in accordance with some embodiments.

FIG. 7 illustrates a flowchart of a method 700 to form a memory device, according to one or more embodiments of the present disclosure. For example, at least some of the operations (or steps) of the method 700 can be used to fabricate a memory device 800 having a number of memory cells 130 arranged across multiple rows and multiple columns (e.g., 103A to 103H of FIG. 5). The memory device 800 may be similar to (or include) the memory device 600 shown in FIG. 6A. However, it should be appreciated that the memory device 800 can be formed in the configuration of the memory device 650 (FIG. 6B), while remaining within the scope of present disclosure.

The method 700 is merely an example, and is not intended to limit the present disclosure. Accordingly, it should be understood that additional operations may be provided before, during, and after the method 700 of FIG. 7, and that some other operations may only be briefly described herein. In some embodiments, operations of the method 700 may be associated with perspective views of the example memory device 800 at various fabrication stages as shown in FIGS. 8, 9, 10, 11, 12, 13, 14, 15, 16, 17, and 18, respectively, which will be discussed in further detail below.

In brief overview, the method 700 starts with operation 702 of forming a first insulation layer over an etch stop layer. The method 700 proceeds to operation 704 of patterning the first insulation layer. The method 700 proceeds to operation 706 of forming a number of metal structures. The method 700 proceeds to operation 708 of forming a gate dielectric layer and a semiconductor layer. The method 700 proceeds to operation 710 of patterning the semiconductor layer to form a number of semiconductor films. The method 700 proceeds to operation 712 of forming a second insulation layer. The method 700 proceeds to operation 714 of forming first recesses extending through the second insulation layer. The method 700 proceeds to operation 716 of forming a number of first conductive structures in the first recesses. The method 700 proceeds to operation 718 of forming second recesses extending through the second insulation layer. The method 700 proceeds to operation 720 of forming a number of second conductive structures in the second recesses. The method 700 proceeds to operation 722 of forming a number of interconnect structures.

Figure 8:
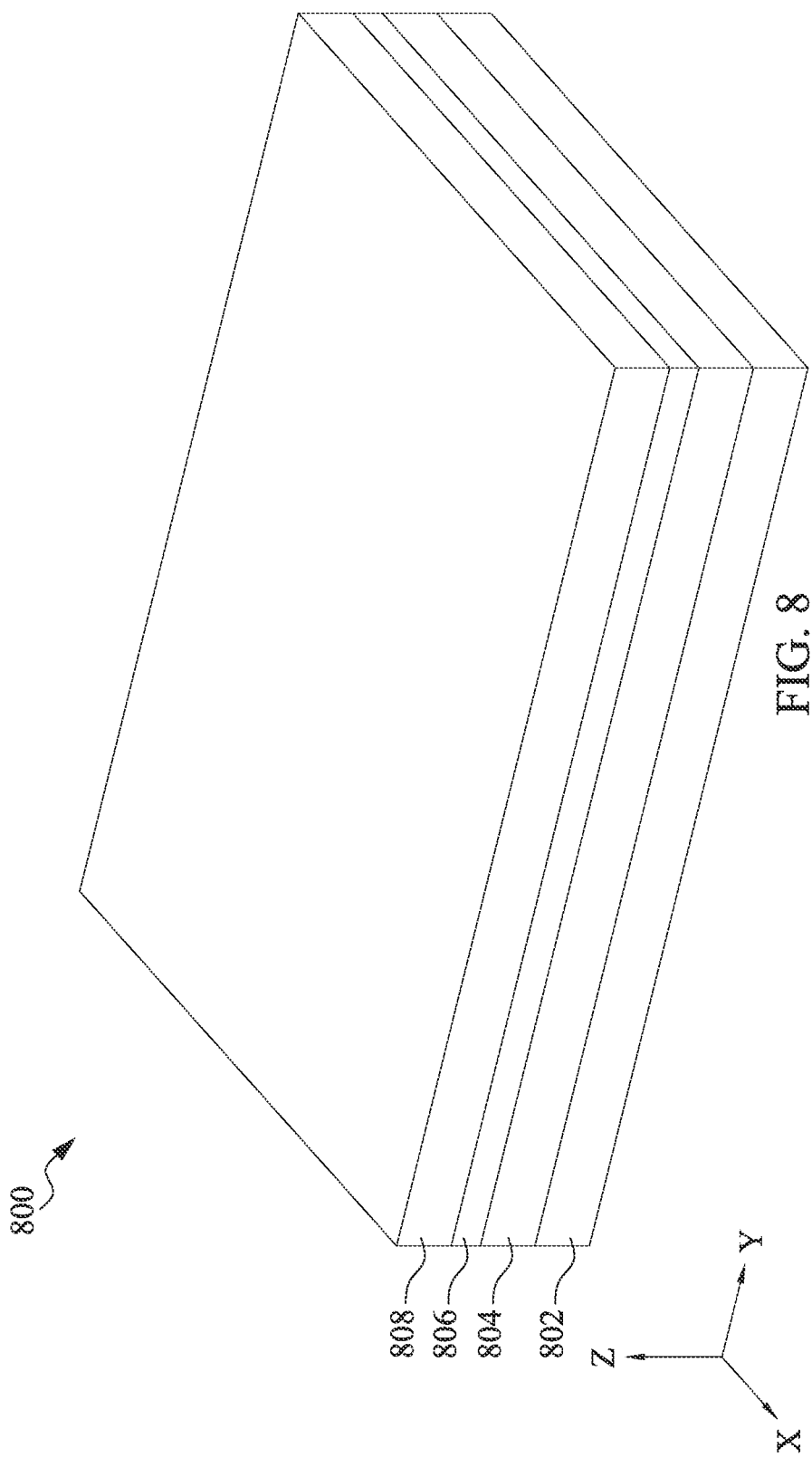
FIGS. 8, 9, 10, 11, 12, 13, 14, 15, 16, 17, and 18 each illustrate a perspective view of an example memory device during various fabrication stages, made by the method of FIG. 7, in accordance with some embodiments.

Corresponding to operation 702 of FIG. 7, FIG. 8 is a perspective view of the memory device 800 including a first insulation layer 808 formed over an etch stop layer (ESL) 806, which is formed over a metallization layer 804, which is formed over a semiconductor substrate 802 at one of the various stages of fabrication, in accordance with various embodiments.

The substrate 802 may be a semiconductor substrate, such as a bulk semiconductor, a semiconductor-on-insulator (SOI) substrate, or the like, which may be doped (e.g., with a p-type or an n-type dopant) or undoped. The substrate 802 may be a wafer, such as a silicon wafer. Generally, an SOI substrate includes a layer of a semiconductor material formed on an insulator layer. The insulator layer may be, for example, a buried oxide (BOX) layer, a silicon oxide layer, or the like. The insulator layer is provided on a substrate, typically a silicon or glass substrate. Other substrates, such as a multi-layered or gradient substrate may also be used. In some embodiments, the semiconductor material of the substrate 802 may include silicon; germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. Other materials are within the scope of the present disclosure.

The metallization layer 804 can include a plurality of interconnect structures disposed within an interlayer dielectric (ILD) material or an intermetal dielectric (IMD) material. Such interconnect structures can electrically connect one or more device components (e.g., transistors) formed over a major surface of the substrate 802. In general, fabrication of those transistors is sometimes referred to as front-end-of-line (FEOL) processing, and fabrication of the metallization layer 804 (and layers over it) is sometimes referred to as back-end-of-line (BEOL) processing. In some other embodiments, the metallization layer 804 may be optional. In other words, the ESL 804 (which will be discussed as follows) is directly formed over the transistors in the FEOL processing.

The ESL 806 may be (e.g., conformally) formed over a top surface of the metallization layer 804, which includes an ILD/IMD material. The ESL 806 may include silicon oxide. The ESL 806 may be formed by a deposition process, such as chemical vapor deposition (CVD) (e.g., plasma enhanced chemical vapor deposition (PECVD), high aspect ratio process (HARP), or combinations thereof) process, atomic layer deposition (ALD) process, another applicable process, or combinations thereof.

The first insulation layer 808 can include at least one insulation material. The insulation materials that can be employed for the insulation layer 808 include, but are not limited to, silicon oxide (including doped or undoped silicate glass), silicon nitride, silicon oxynitride, organosilicate glass (OSG), spin-on dielectric materials, dielectric metal oxides that are generally known as high dielectric constant (high-k) dielectric oxides (e.g., aluminum oxide, hafnium oxide, etc.) and silicates thereof, dielectric metal oxynitrides and silicates thereof, and organic insulation materials. Other insulation materials are within the scope of the present disclosure. In one embodiment, the first insulation layer 808 includes silicon oxide.

Figure 9:
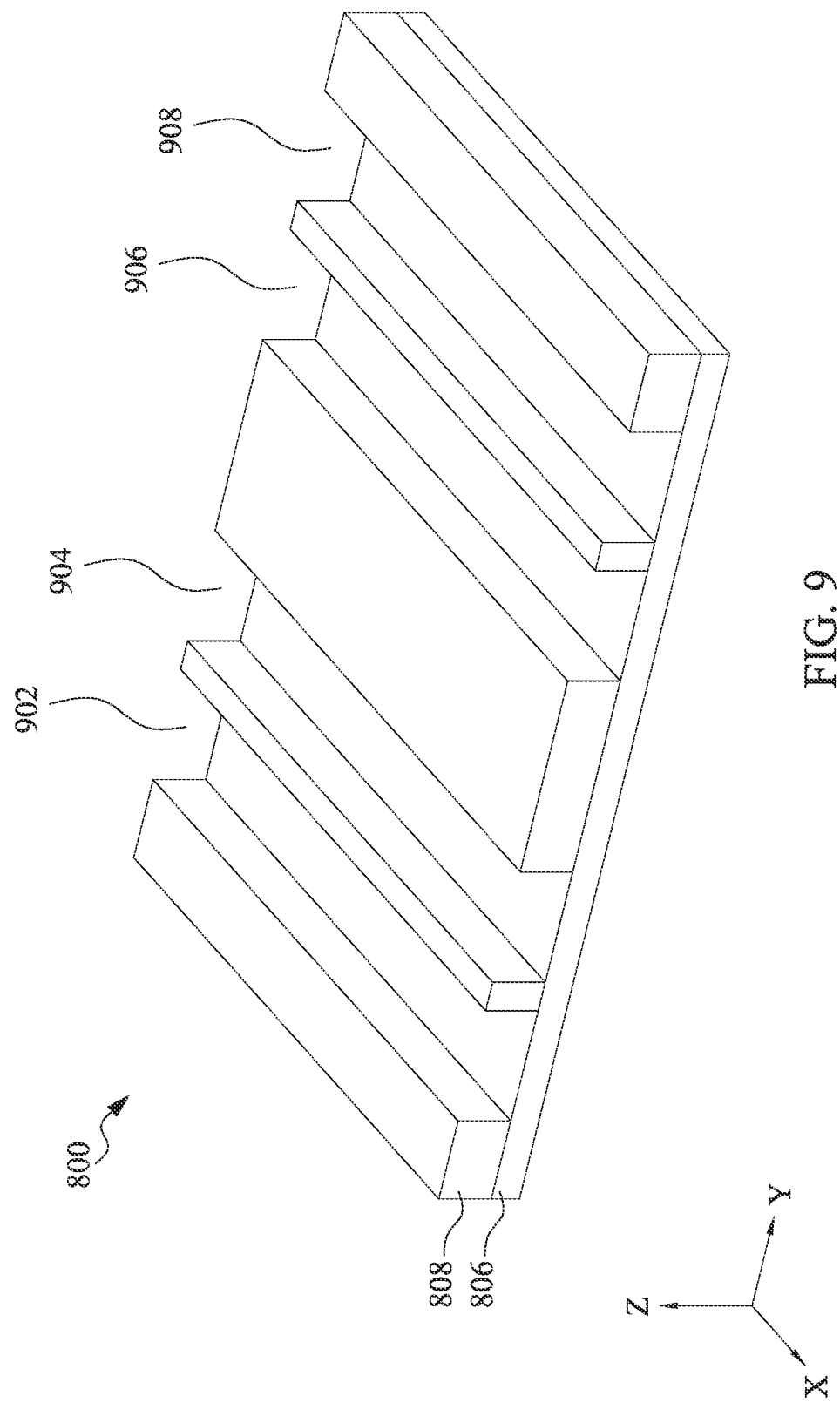

Corresponding to operation 704 of FIG. 7, FIG. 9 is a perspective view of the memory device 800 in which the first insulation layer 808 is patterned at one of the various stages of fabrication, in accordance with various embodiments. It should be noted that FIG. 9 (and the following figures) do not include the semiconductor substrate 802 and metallization layer 804 shown in FIG. 8, for purposes of clarity.

As shown, the first insulation layer 808 is patterned to form trenches 902, 904, 906, and 908. The trenches 902 to 908 each extend along a lateral direction (e.g., the X direction) to traverse across the first insulation layer 808. The trenches 902 to 908 are in parallel with one another. In some embodiments, the trenches (when the number of trenches is equal to or greater than 4) can be grouped to multiple pairs, wherein the trenches in each pair is disposed closer to each other than the trench of an adjacent pair. For example in FIG. 9, the trench 904 is closer to the trench 902 (which form a pair) than the trench 906 (which is part of an adjacent pair).

The trenches 902 to 908 can be formed by using an etching process over the workpiece. For example, a patterned mask layer (not shown) can be formed over the first insulation layer 808 that exposes multiple portions (that define the footprints of the trenches 902 to 908, respectively), and the etching process is performed to form the trenches. The etching process may include, for example, a reactive ion etch (RIE) process, a neutral beam etch (NBE) process, the like, or combinations thereof. The etching process may be anisotropic, with the ESL 806 functioning as a stop layer. That is, the etching process can stop upon the ESL 806 is exposed.

Figure 10:
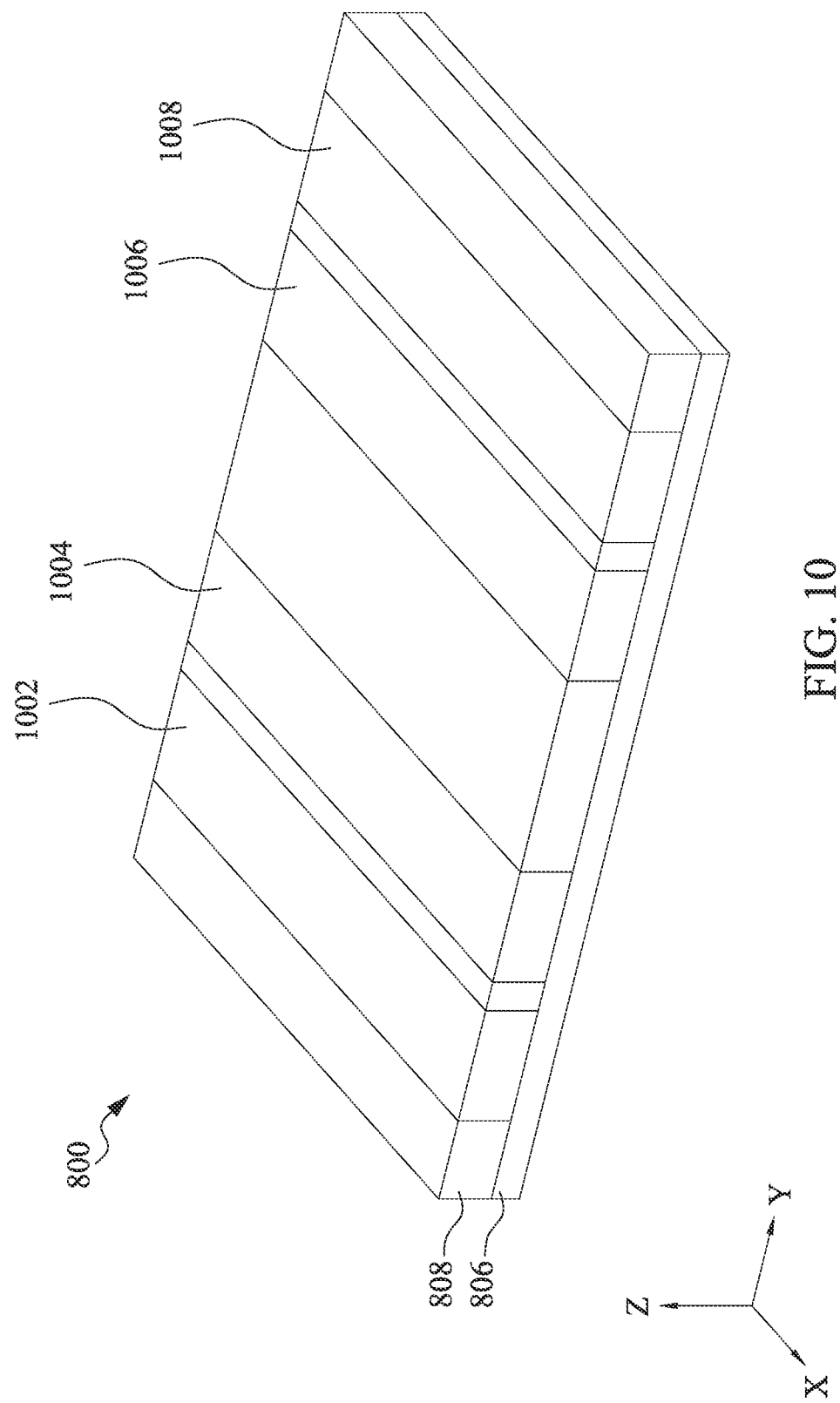

Corresponding to operation 706 of FIG. 7, FIG. 10 is a perspective view of the memory device 800 including metal structures 1002, 1004, 1006, and 1008 at one of the various stages of fabrication, in accordance with various embodiments.

The metal structures 1002 to 1008 can be formed by filling the trenches 902 to 908 (FIG. 9) with a metal material. The metal material can be selected from the group consisting of aluminum, tungsten, tungsten nitride, copper, cobalt, silver, gold, chrome, ruthenium, platinum, titanium, titanium nitride, tantalum, tantalum nitride, nickel, hafnium, and combinations thereof. Other metal materials are within the scope of the present disclosure. The metal structures 1002 to 1008 can be formed by overlaying the workpiece with the above-listed metal material by, for example, chemical vapor deposition (CVD), physical vapor deposition (PVD), electroless plating, electroplating, or combinations thereof. This can be followed by a polishing process to remove the excess metal material. Other methods of forming the metal structures 1002 to 1008 are within the scope of present disclosure.

Figure 11:
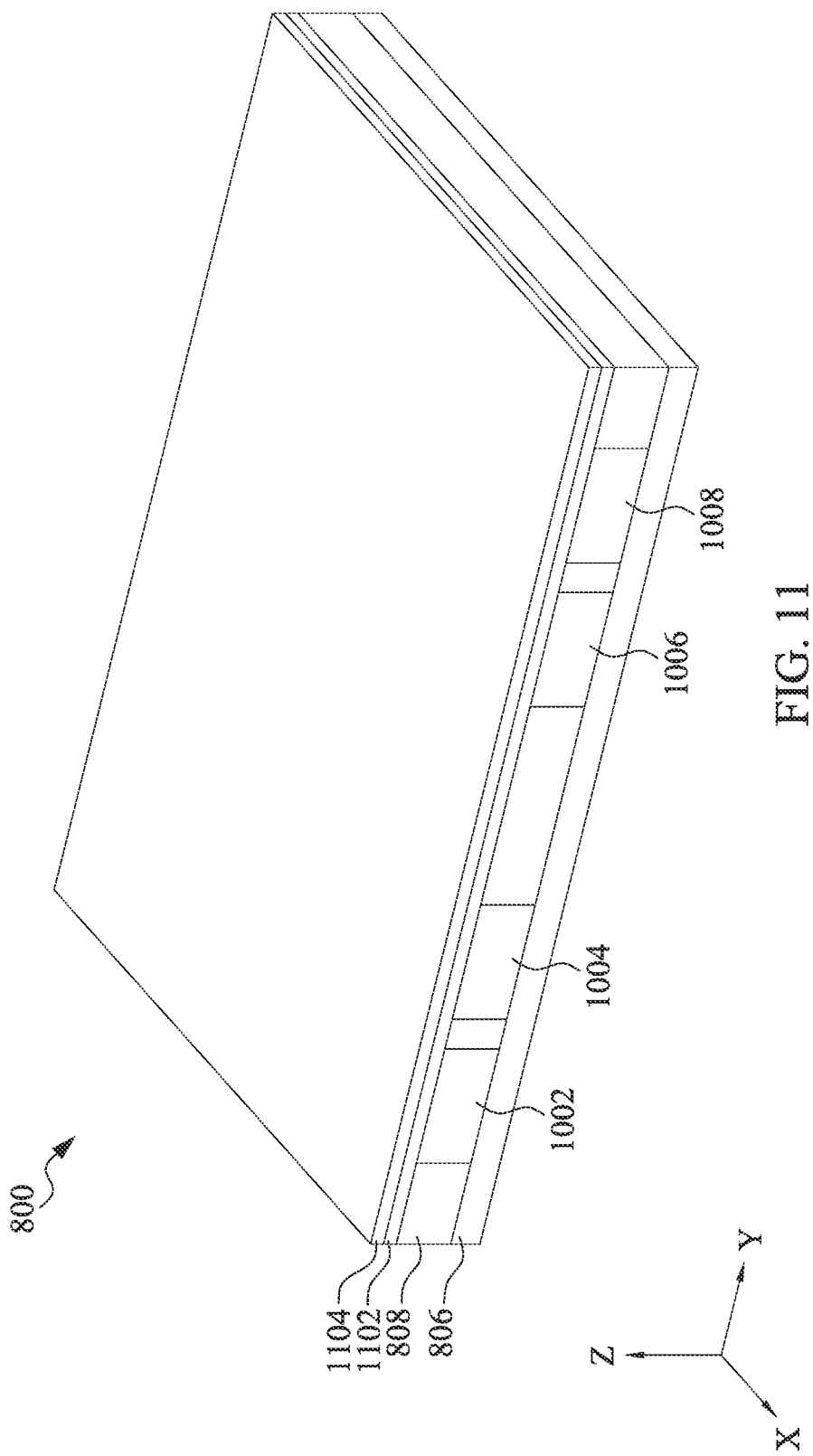

Corresponding to operation 708 of FIG. 7, FIG. 11 is a perspective view of the memory device 800 including a gate dielectric layer 1102 and a semiconductor layer 1104 at one of the various stages of fabrication, in accordance with various embodiments.

The gate dielectric layer 1102 is (e.g., conformally) formed over the first insulation layer 808 that has the metal structures 1002 to 1008 embedded therein. The gate dielectric layer 1102 can include a material selected from the group consisting of: $HfO_2$, $Hf_{1-x}Zr_xO_2$, $ZrO_2$, $TiO_2$, $NiO$, $TaO_x$, $Cu_2O$, $Nb_2O_5$, $AlO_x$, and combinations thereof. The gate dielectric layer 1102 can include any of various other dielectric materials that are suitable as in memory devices such as, for example, other high-k dielectric materials, ferroelectric materials, etc., while remaining within the scope of the present disclosure. The gate dielectric layer 1102 can be formed, for example, by a conformal deposition method such as atomic layer deposition (ALD) or chemical vapor deposition (CVD). Other deposition methods are within the scope of the present disclosure.

The semiconductor layer 1104 is (e.g., conformally) formed over the gate dielectric layer 1102. The semiconductor layer 1104 may include a doped or undoped semiconductor material such as, for example, Si (e.g., polysilicon or amorphous silicon), Ge, SiGe, silicon carbide (SiC), indium gallium zinc oxide (IGZO), indium tin oxide (ITO), indium zinc oxide (IZO), indium tungsten oxide (IWO), or combinations thereof. The semiconductor layer 1104 can be formed, for example, by a conformal deposition method such as atomic layer deposition (ALD) or chemical vapor deposition (CVD). Other deposition methods are within the scope of the present disclosure.

Figure 12:
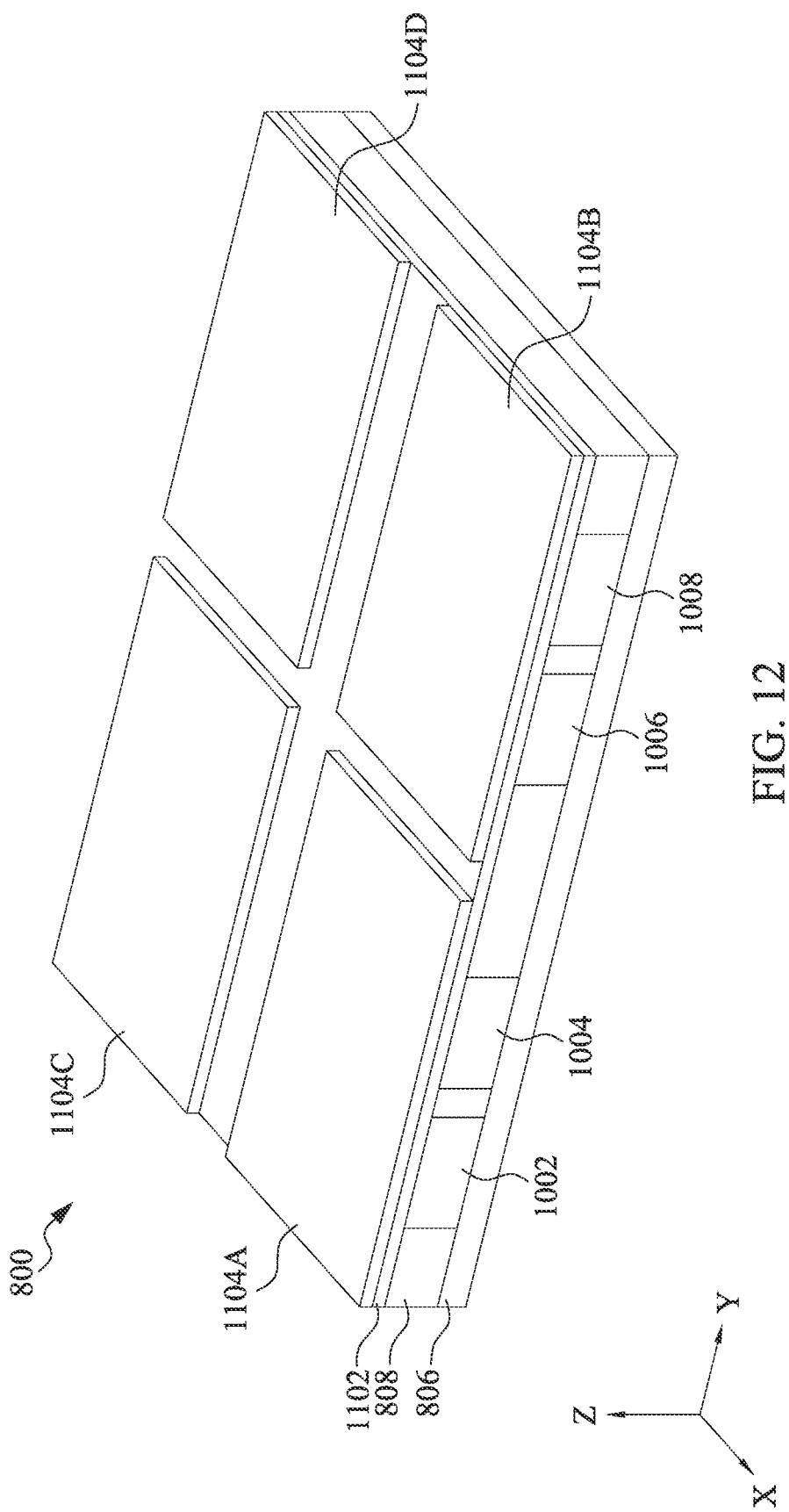

Corresponding to operation 710 of FIG. 7, FIG. 12 is a perspective view of the memory device 800 in which the semiconductor layer 1104 is patterned at one of the various stages of fabrication, in accordance with various embodiments.

In the illustrated example of FIG. 12, the semiconductor layer 1104 is patterned (or otherwise cut) into a number of portions (or semiconductor films), 1104A, 1104B, 1104C, and 1104D. In some embodiments, each semiconductor portion is defined as a footprint for forming two adjacent memory cells. For example, while referring again to FIG. 5, the semiconductor film 1104A may form a footprint for the memory cells 103A and 103B; the semiconductor film 1104B may form a footprint for the memory cells 103C and 103D; the semiconductor film 1104C may form a footprint for the memory cells 103E and 103F; and the semiconductor film 1104D may form a footprint for the memory cells 103G and 103H. The semiconductor films 1104A to 1104D can be formed by performing an etching process. The etching process may include, for example, a reactive ion etch (RIE) process, a neutral beam etch (NBE) process, the like, or combinations thereof. The etching process may be anisotropic.

Figure 13:
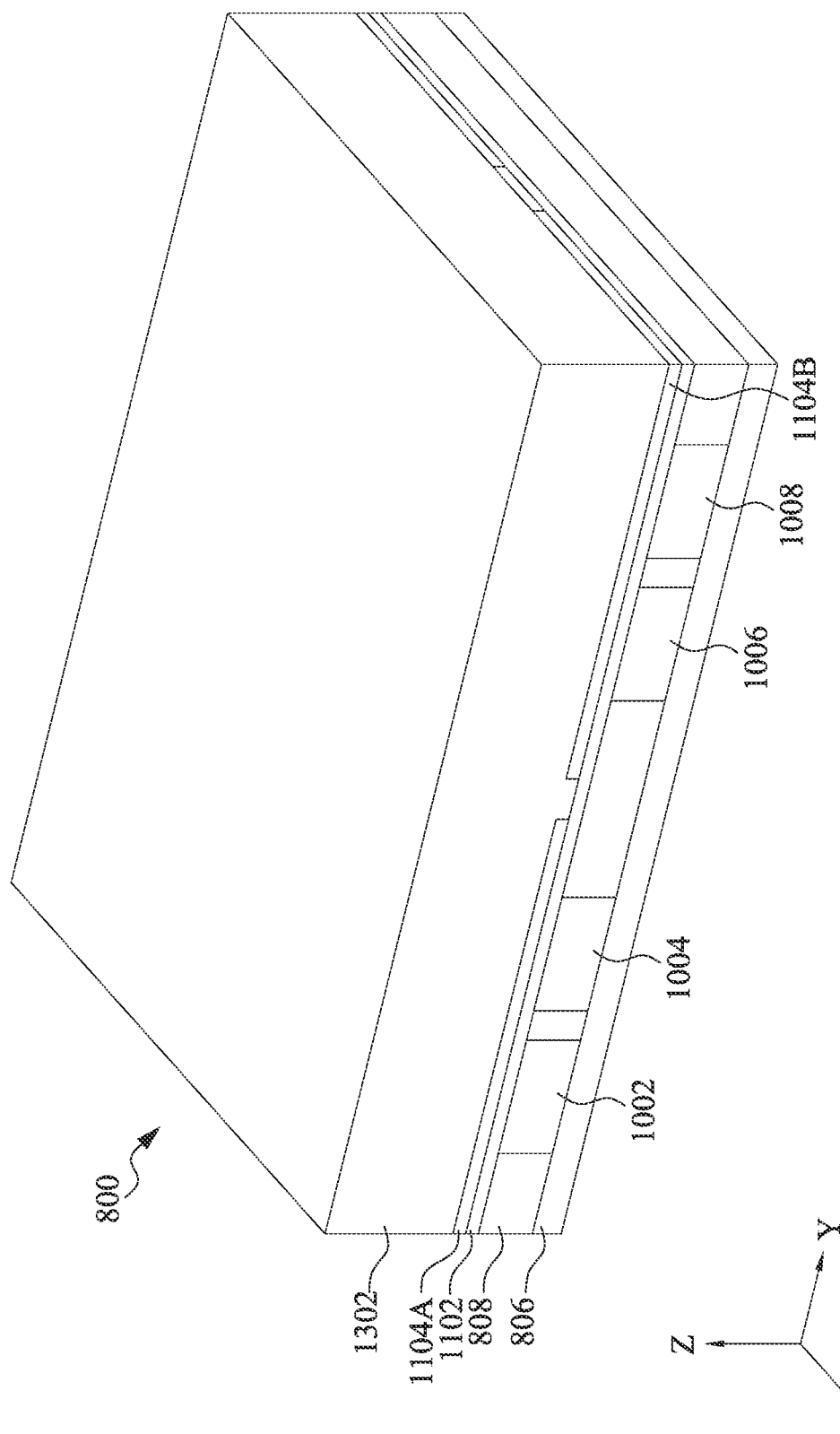

Corresponding to operation 712 of FIG. 7, FIG. 13 is a perspective view of the memory device 800 including a second insulation layer 1302 at one of the various stages of fabrication, in accordance with various embodiments.

The second insulation layer 1302 is formed over the patterned semiconductor films 1104A to 1104D (where 1104C-D are not observable in FIG. 13). As such, the trenches between the adjacent semiconductor films can be filled by the second insulation layer 1302, and portions of the gate dielectric layer 1102 can contact the second insulation layer 1302. The second insulation layer 1302 can include at least one insulation material. The insulation materials that can be employed for the insulation layer 1302 include, but are not limited to, silicon oxide (including doped or undoped silicate glass), silicon nitride, silicon oxynitride, organosilicate glass (OSG), spin-on dielectric materials, dielectric metal oxides that are generally known as high dielectric constant (high-k) dielectric oxides (e.g., aluminum oxide, hafnium oxide, etc.) and silicates thereof, dielectric metal oxynitrides and silicates thereof, and organic insulation materials. Other insulation materials are within the scope of the present disclosure. In one embodiment, the second insulation layer 1302 includes silicon oxide.

Figure 14:
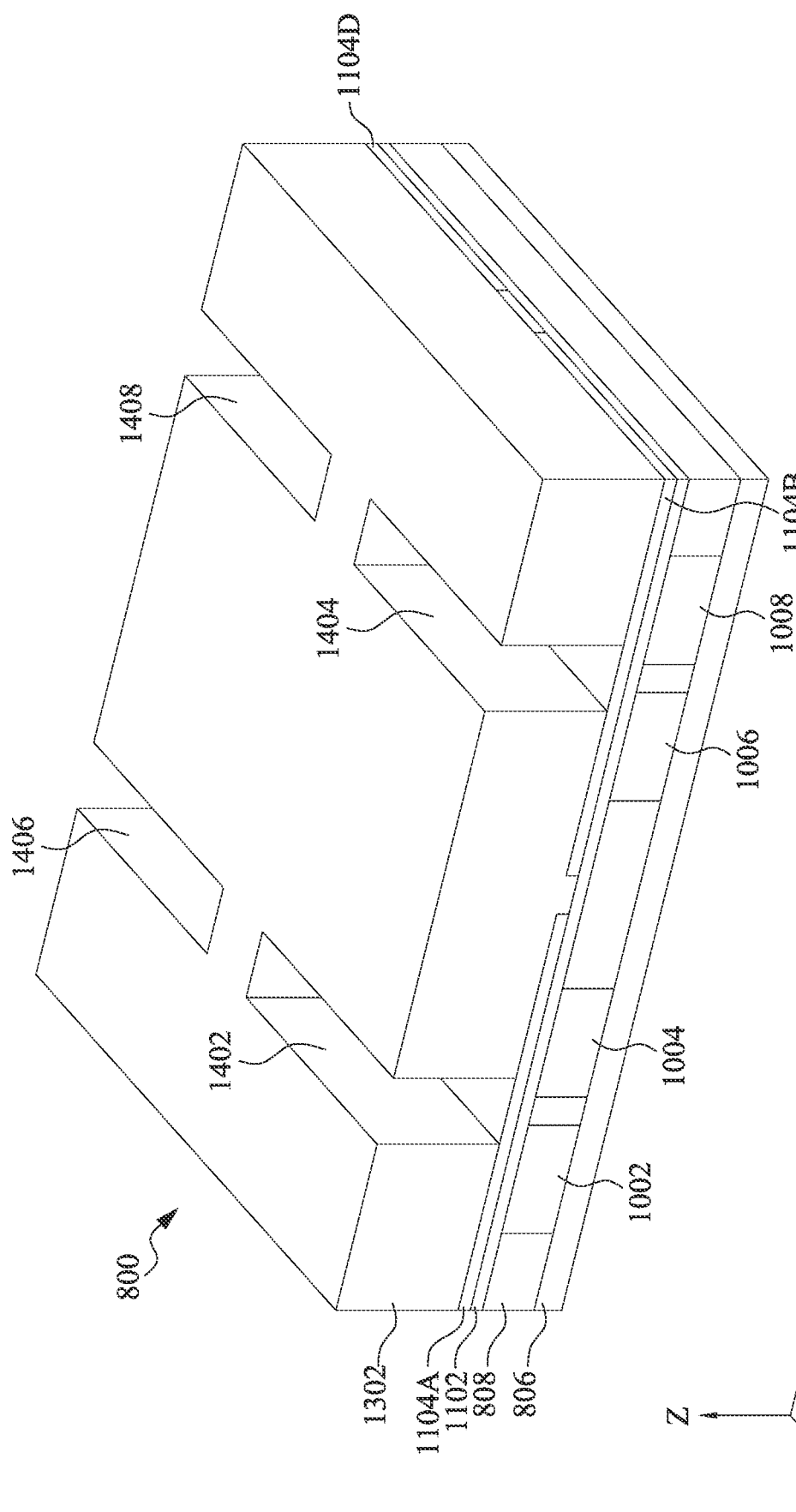

Corresponding to operation 714 of FIG. 7, FIG. 14 is a perspective view of the memory device 800 in which a number of recesses 1402, 1404, 1406, and 1408 are formed in the second insulation layer 1302 at one of the various stages of fabrication, in accordance with various embodiments.

In some embodiments, each of the recesses 1402 to 1408 is formed to expose the middle portion of a corresponding semiconductor film by vertically extending through the second insulation layer 1302. Such an exposed middle portion can extend across each semiconductor film along the X direction, i.e., extending from one side to an opposite side of the semiconductor film. As such, the recesses 1402 to 1408 are isolated from one another with a portion of the second insulation layer 1302.

For example in FIG. 14, the recess 1402 can expose a middle portion of the semiconductor film 1104A; the recess 1404 can expose a middle portion of the semiconductor film 1104B; the recess 1406 can expose a middle portion of the semiconductor film 1104C (which is not observable in FIG. 14); and the recess 1408 can expose a middle portion of the semiconductor film 1104D. The recesses 1402 to 1408 can be formed by performing an etching process. The etching process may include, for example, a reactive ion etch (RIE) process, a neutral beam etch (NBE) process, the like, or combinations thereof. The etching process may be anisotropic.

Figure 15:
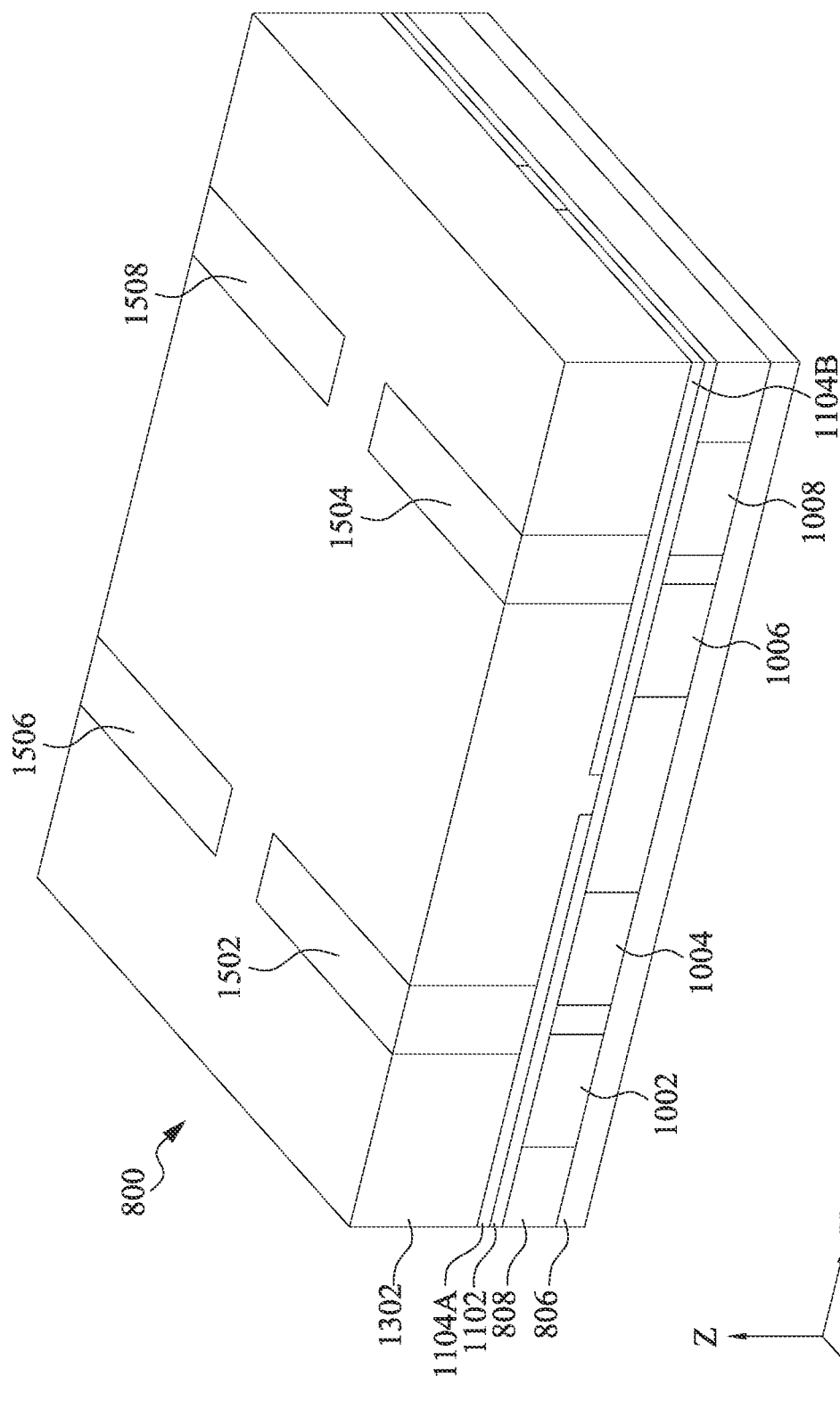

Corresponding to operation 716 of FIG. 7, FIG. 15 is a perspective view of the memory device 800 including conductive structures 1502, 1504, 1506, and 1508 at one of the various stages of fabrication, in accordance with various embodiments.

The conductive structures 1502, 1504, 1506, and 1508 can be formed by filling the recesses 1402 to 1408 (FIG. 14) with a conductive material such as, for example, a metal material, a semiconductor material, etc. The metal material can be selected from the group consisting of aluminum, tungsten, tungsten nitride, copper, cobalt, silver, gold, chrome, ruthenium, platinum, titanium, titanium nitride, tantalum, tantalum nitride, nickel, hafnium, and combinations thereof. Other metal materials are within the scope of the present disclosure. Non-limiting examples of the semiconductor material include Si (e.g., polysilicon or amorphous silicon), Ge, SiGe, silicon carbide (SiC), indium gallium zinc oxide (IGZO), indium tin oxide (ITO), indium zinc oxide (IZO), indium tungsten oxide (IWO), or combinations thereof.

The conductive structures 1502 to 1508 can be formed by overlaying the workpiece with the above-listed metal/semiconductor material by, for example, chemical vapor deposition (CVD), physical vapor deposition (PVD), electroless plating, electroplating, or combinations thereof. This can be followed by a polishing process to remove the excess metal/semiconductor material. Other methods of forming the conductive structures 1502 to 1508 are within the scope of present disclosure.

Figure 16:
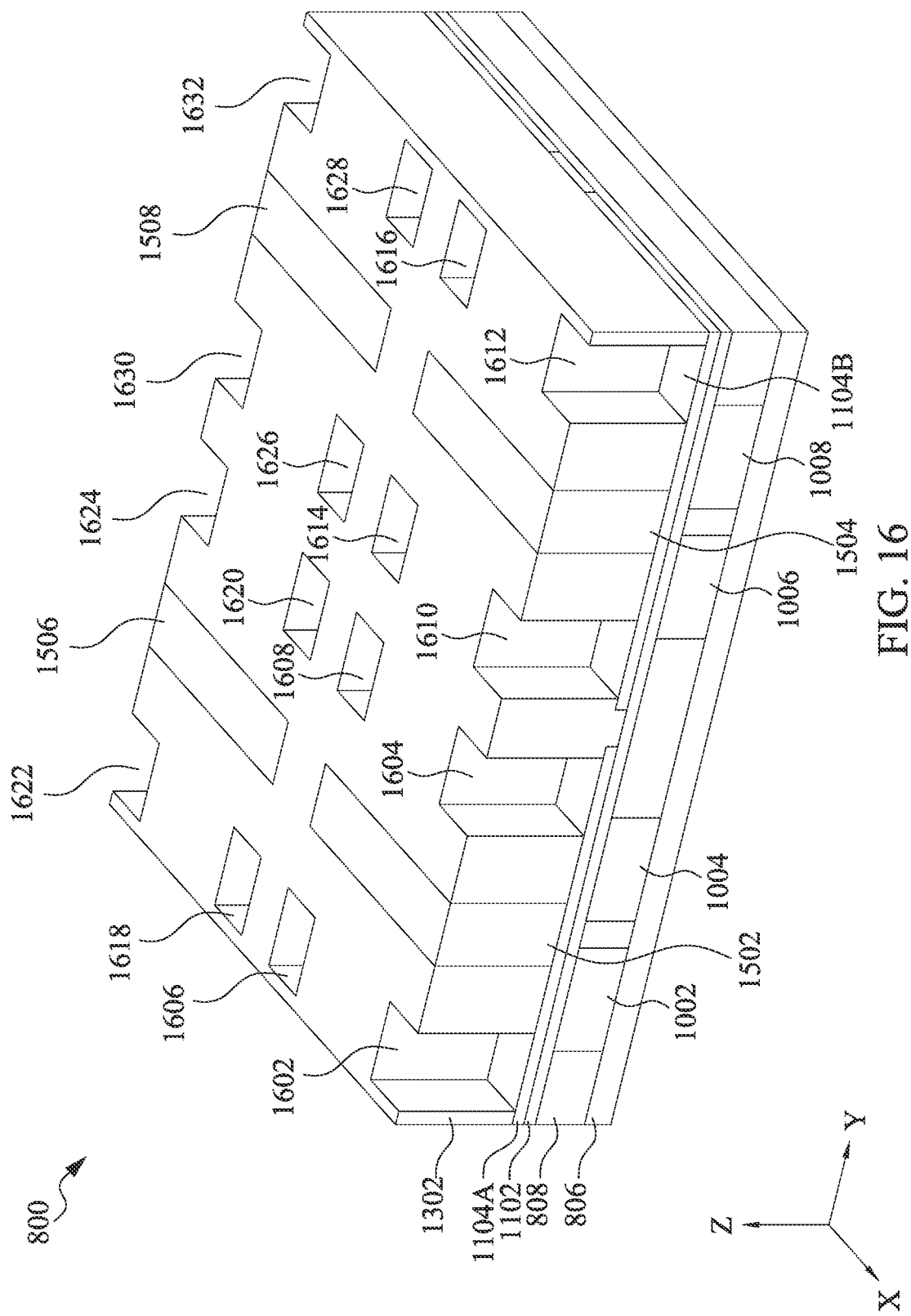

Corresponding to operation 718 of FIG. 7, FIG. 16 is a perspective view of the memory device 800 in which a number of recesses 1602, 1604, 1606, 1608, 1610, 1612, 1614, 1616, 1618, 1620, 1622, 1624, 1626, 1628, 1630, and 1632 are further formed in the second insulation layer 1302 at one of the various stages of fabrication, in accordance with various embodiments.

In some embodiments, each of the recesses 1602 to 1632 is formed to expose the corner portion of a corresponding semiconductor film by vertically extending through the second insulation layer 1302. A first pair of the exposed corner portions can be disposed on one side of the middle portion of each semiconductor film (that is filled by one of the conductive structures 1502 to 1508) along the X direction, and second pair of the exposed corner portions can be disposed on the other side of the middle portion along the X direction. The recesses 1602 to 1632 are isolated from one another, and from the formed conductive structures 1502 to 1508, with a portion of the second insulation layer 1302.

For example in FIG. 16, the recesses 1602 and 1606, which form a first pair on one side of the conductive structure 1502, can respectively expose two corner portions of the semiconductor film 1104A; and the recesses 1604 and 1608, which form a second pair on the other side of the conductive structure 1502, can respectively expose other two corner portions of the semiconductor film 1104A. The recesses 1610 and 1614, which form a first pair on one side of the conductive structure 1504, can respectively expose two corner portions of the semiconductor film 1104B; and the recesses 1612 and 1616, which form a second pair on the other side of the conductive structure 1504, can respectively expose other two corner portions of the semiconductor film 1104B. The recesses 1618 and 1622, which form a first pair on one side of the conductive structure 1506, can respectively expose two corner portions of the semiconductor film 1104C (not observable in FIG. 16); and the recesses 1620 and 1624, which form a second pair on the other side of the conductive structure 1506, can respectively expose other two corner portions of the semiconductor film 1104C. The recesses 1626 and 1630, which form a first pair on one side of the conductive structure 1508, can respectively expose two corner portions of the semiconductor film 1104D (not observable in FIG. 16); and the recesses 1628 and 1632, which form a second pair on the other side of the conductive structure 1508, can respectively expose other two corner portions of the semiconductor film 1104D.

The recesses 1602 to 1632 can be formed by performing an etching process. The etching process may include, for example, a reactive ion etch (RIE) process, a neutral beam etch (NBE) process, the like, or combinations thereof. The etching process may be anisotropic.

Figure 17:
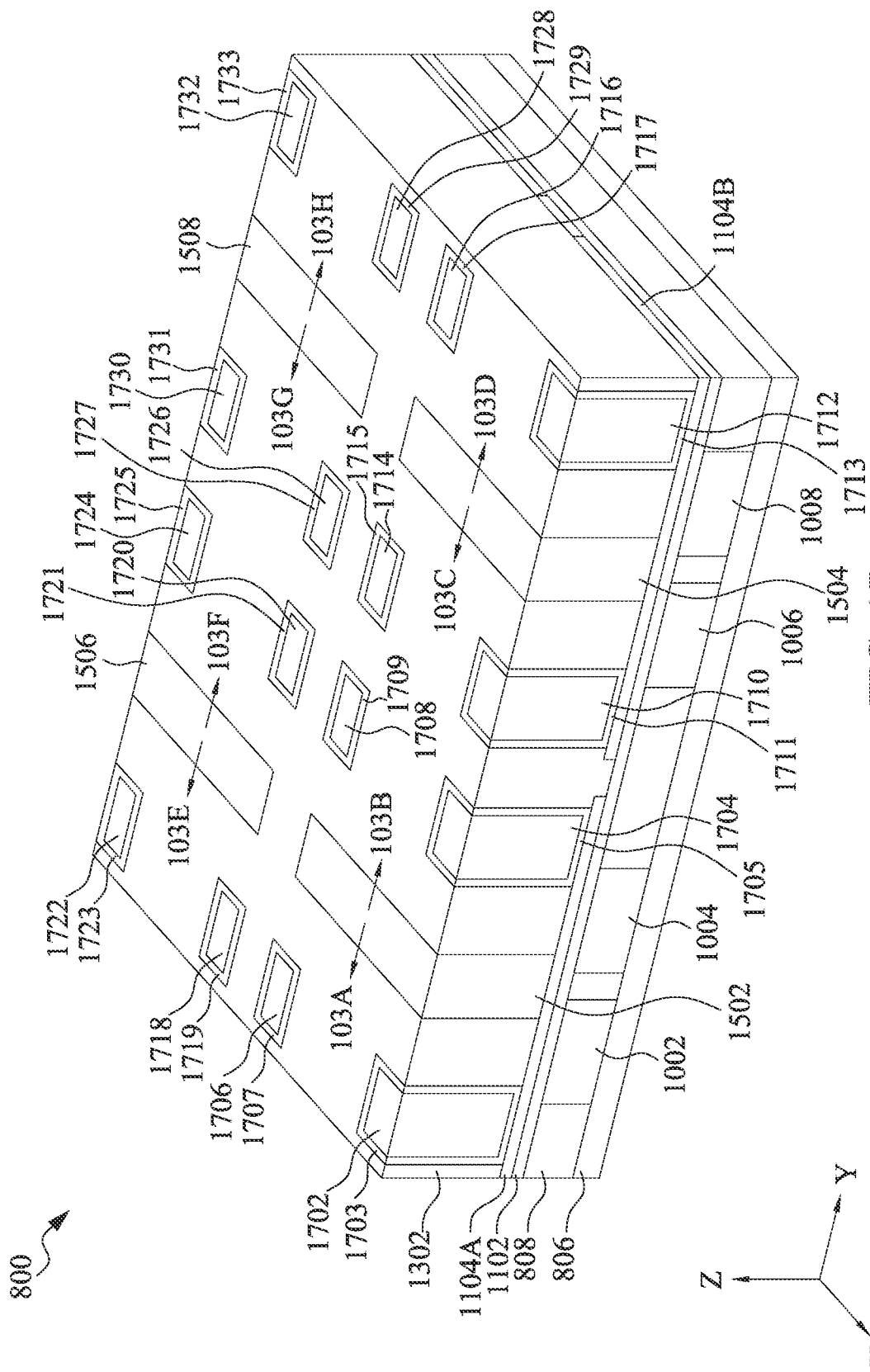

Corresponding to operation 720 of FIG. 7, FIG. 17 is a perspective view of the memory device 800 including conductive structures 1702, 1704, 1706, 1708, 1710, 1712, 1714, 1716, 1718, 1720, 1722, 1724, 1726, 1728, 1730, and 1732 at one of the various stages of fabrication, in accordance with various embodiments.

The conductive structures 1702 to 1732 can be formed by filling the recesses 1602 to 1632 (FIG. 16) with a conductive material such as, for example, a metal material, a semiconductor material, etc. The metal material can be selected from the group consisting of aluminum, tungsten, tungsten nitride, copper, cobalt, silver, gold, chrome, ruthenium, platinum, titanium, titanium nitride, tantalum, tantalum nitride, nickel, hafnium, and combinations thereof. Other metal materials are within the scope of the present disclosure. Non-limiting examples of the semiconductor material include Si (e.g., polysilicon or amorphous silicon), Ge, SiGe, silicon carbide (SiC), indium gallium zinc oxide (IGZO), indium tin oxide (ITO), indium zinc oxide (IZO), indium tungsten oxide (IWO), or combinations thereof.

The conductive structures 1702 to 1732 can be formed by overlaying the workpiece with the above-listed metal/semiconductor material by, for example, chemical vapor deposition (CVD), physical vapor deposition (PVD), electroless plating, electroplating, or combinations thereof. This can be followed by a polishing process to remove the excess metal/semiconductor material. Other methods of forming the conductive structures 1702 to 1732 are within the scope of present disclosure.

Prior to forming the conductive structures 1702 to 1732, each of the recesses 1602 to 1632 may be lined with a conformal dielectric film. For example in FIG. 17, the recesses 1602 to 1632 are lined with dielectric films 1703, 1705, 1707, 1709, 1711, 1713, 1715, 1717, 1719, 1721, 1723, 1725, 1727, 1729, 1731, and 1733, respectively. Thus, after forming the conductive structures 1702 to 1732, each of the conductive structures 1702 to 1732 has its bottom surface and sidewalls lined by the respective one of the dielectric films 1703 to 1733. As a representative example, the conductive structure 1702 may have its bottom surface and sidewalls lined by the dielectric film 1703. The conductive structure 1702 is therefore coupled to (not in direct contact with) the semiconductor film 1104A. As discussed above with respect to FIGS. 6A-B, the dielectric films 1703 to 1733 can each serve as the "broken-downable" layer of a corresponding capacitor.

The dielectric films 1703 to 1733 can each include a material selected from the group consisting of: $HfO_2$, $Hf_{1-x}Zr_xO_2$, $ZrO_2$, $TiO_2$, NiO, $TaO_x$, $Cu_2O$, $Nb_2O_5$, $AlO_x$, and combinations thereof. The dielectric films 1703 to 1733 can each include any of various other dielectric materials that are suitable as in memory devices such as, for example, other high-k dielectric materials, ferroelectric materials, etc., while remaining within the scope of the present disclosure. The dielectric films 1703 to 1733 can be formed, for example, by a conformal deposition method such as atomic layer deposition (ALD) or chemical vapor deposition (CVD). Other deposition methods are within the scope of the present disclosure.

Upon forming the conductive structures 1702 to 1732, a number of the disclosed memory cells 103A to 103H (FIG. 5) can be formed. For example, the memory cell 103A may be formed at least by the conductive structures 1702 and 1706, the dielectric films 1703 and 1707, the conductive structure 1502, the left portion of the semiconductor film 1104A, the gate dielectric layer 1102, and the metal structure 1002, with the metal structure 1002 functioning as the $WL_1$ and the conductive structures 1702 and 1706 electrically connected to the $SL_{11}$ and $SL_{21}$, respectively (as discussed above with respect to FIGS. 6A-B and will be discussed as follows). Specifically, the left portion of the semiconductor film 1104A, the gate dielectric layer 1102, and the metal structure 1002 can form the transistor 202A of the memory cell 103A; the conductive structure 1702, the dielectric film 1703, and the left portion of the semiconductor film 1104A can form the capacitor 204A of the memory cell 103A; and the conductive structure 1706, the dielectric film 1707, and the left portion of the semiconductor film 1104A can form the capacitor 206A of the memory cell 103A.

The memory cell 103B may be formed at least by the conductive structures 1704 and 1708, the dielectric films 1705 and 1709, the conductive structure 1502, the right portion of the semiconductor film 1104A, the gate dielectric layer 1102, and the metal structure 1004, with the metal structure 1004 functioning as the $WL_2$ and the conductive structures 1704 and 1708 electrically connected to the $SL_{11}$ and $SL_{21}$, respectively. Specifically, the right portion of the semiconductor film 1104A, the gate dielectric layer 1102, and the metal structure 1004 can form the transistor 202B of the memory cell 103B; the conductive structure 1704, the dielectric film 1705, and the right portion of the semiconductor film 1104A can form the capacitor 204B of the memory cell 103B; and the conductive structure 1708, the dielectric film 1709, and the right portion of the semiconductor film 1104A can form the capacitor 206B of the memory cell 103B.

Figure 18:
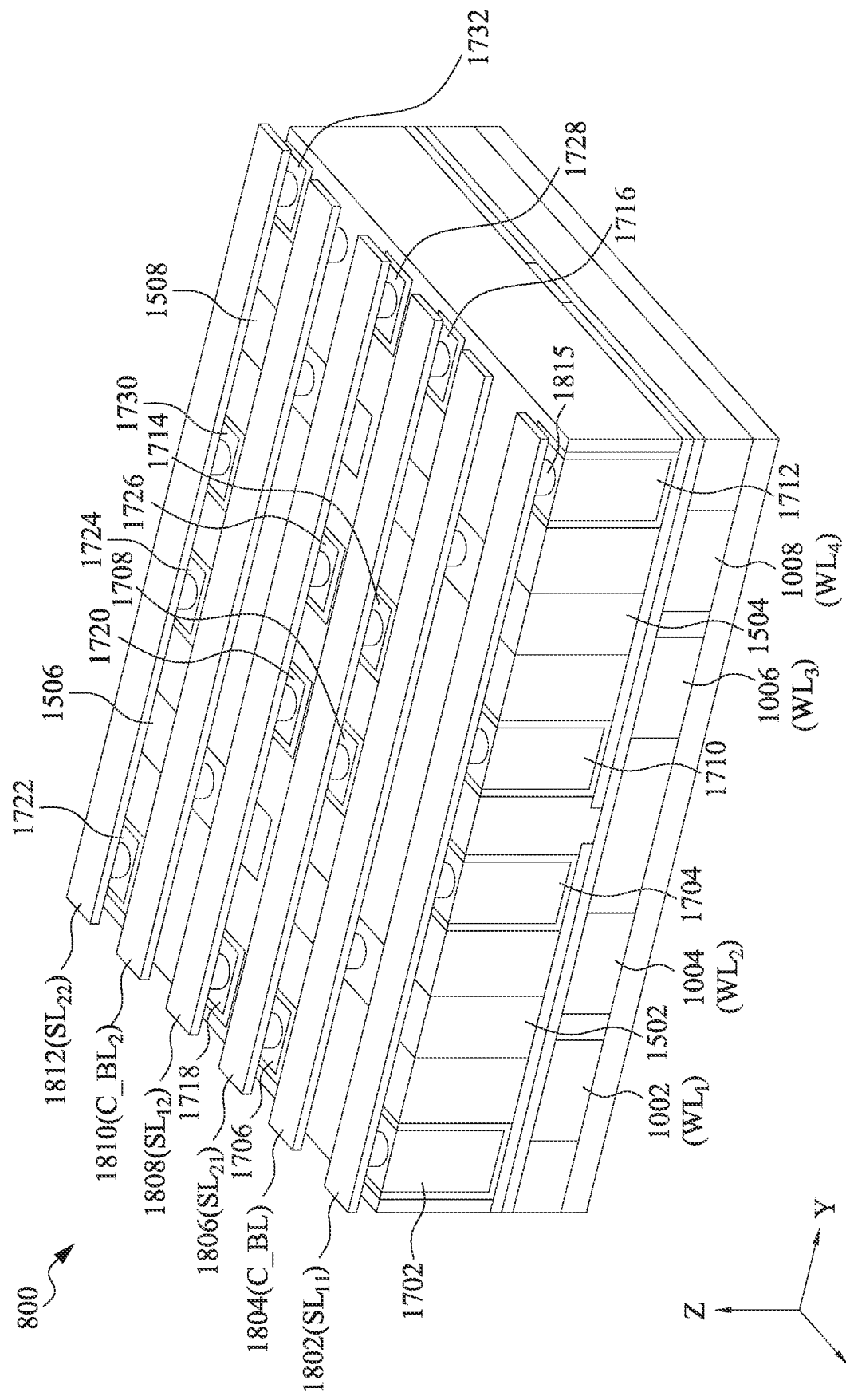

Corresponding to operation 722 of FIG. 7, FIG. 18 is a perspective view of the memory device 800 including interconnect structures 1802, 1804, 1806, 1808, 1810, and 1812 at one of the various stages of fabrication, in accordance with various embodiments.

In some embodiments, the interconnect structures 1802 to 1812 extend along a lateral direction (e.g., the Y direction) perpendicular to a lengthwise direction of the metal structures (WLs) 1002 to 1008. Each of the interconnect structures 1802 to 1812, either functioning as a SL or BL, is electrically coupled to a number of memory cells through a number of conductive structures. For example in FIG. 18, the interconnect structure 1802, functioning as the $SL_{11}$, is connected to the memory cells 103A, 103B, 103C, and 103D (which can be better seen in FIG. 17) through the conductive structures 1702, 1704, 1710, and 1712, respectively; the interconnect structure 1804, functioning as the $C\_BL_1$, is connected to the memory cells 103A-B and 103C-D (which can be better seen in FIG. 17) through the conductive structures 1502 and 1504, respectively; the interconnect structure 1806, functioning as the $SL_{21}$, is connected to the memory cells 103A, 103B, 103C, and 103D (which can be better seen in FIG. 17) through the conductive structures 1706, 1708, 1714, and 1716, respectively; the interconnect structure 1808, functioning as the $SL_{12}$, is connected to the memory cells 103E, 103F, 103G, and 103H (which can be better seen in FIG. 17) through the conductive structures 1718, 1720, 1726, and 1728, respectively; the interconnect structure 1810, functioning as the $C\_BL_2$, is connected to the memory cells 103E-F and 103G-H (which can be better seen in FIG. 17) through the conductive structures 1506 and 1508, respectively; the interconnect structure 1812, functioning as the $SL_{22}$, is connected to the memory cells 103E, 103F, 103G, and 103H (which can be better seen in FIG. 17) through the conductive structures 1722, 1724, 1730, and 1732, respectively.

Further, each of the interconnect structures 1802 to 1812 is coupled to a number of conductive structures through one or more via structures 1815. The interconnect structures 1802 to 1812 and the via structures 1815 are formed with a metal material. The metal material can be selected from the group consisting of aluminum, tungsten, tungsten nitride, copper, cobalt, silver, gold, chrome, ruthenium, platinum, titanium, titanium nitride, tantalum, tantalum nitride, nickel, hafnium, and combinations thereof.

In one aspect of the present disclosure, a semiconductor device is disclosed. The semiconductor device includes a gate dielectric layer. The semiconductor device includes a first semiconductor film disposed on a first side of the gate dielectric layer. The semiconductor device includes a first metal structure disposed on a second side of the gate dielectric layer opposite to the first side, wherein the first metal structure extends along a first lateral direction. The semiconductor device includes a first conductive structure disposed on the second side over the first semiconductor film, wherein the first conductive structure extends along the first lateral direction to traverse across the first semiconductor film, and further extends along a vertical direction. The semiconductor device includes a second conductive structure disposed on the second side over the first semiconductor film, wherein the second conductive structure extends along the vertical direction. The semiconductor device includes a third conductive structure disposed on the second side over the first semiconductor film, wherein the third conductive structure extends along the vertical direction.

In another aspect of the present disclosure, a memory system is disclosed. The memory system includes a memory array comprising a plurality of memory cells, each of the memory cells including a transistor coupled to a first capacitor and a second capacitor in series, respectively. The memory system includes an authentication circuit operatively coupled to the memory array. The authentication circuit is configured to generate a Physically Unclonable Function (PUF) signature based on respective logic states of the plurality of memory cells, and wherein the logic state of each of the plurality of memory cells is determined based on a preceding breakdown of either the corresponding first capacitor or second capacitor.

In yet another aspect of the present disclosure, a method for fabricating memory devices is disclosed. The method includes forming a first word line (WL) that extends along a first lateral direction. The method includes forming a gate dielectric layer over the first WL. The method includes patterning a semiconductor layer disposed over the gate dielectric layer. The method includes forming a first conductive structure over the patterned semiconductor layer, wherein the first conductive structure extends along the first lateral direction to traverse across the patterned semiconductor layer, and further extends along a vertical direction. The method includes forming a second conductive structure and third conductive structure over the patterned semiconductor layer, wherein the second and third conductive structures, disposed on a first side of the first conductive structure along a second lateral direction, each extend along the vertical direction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
 a gate dielectric layer;
 a first semiconductor film disposed on a first side of the gate dielectric layer;
 a first metal structure disposed on a second side of the gate dielectric layer opposite to the first side, wherein the first metal structure extends along a first lateral direction;
 a first conductive structure disposed on the first side over the first semiconductor film, wherein the first conductive structure extends along the first lateral direction to traverse across the first semiconductor film, and further extends along a vertical direction;
 a second conductive structure disposed on the first side over the first semiconductor film, wherein the second conductive structure extends along the vertical direction, and wherein the second conductive structure, the first semiconductor film, and a first dielectric film therebetween forms a first capacitor; and
 a third conductive structure disposed on the first side over the first semiconductor film, wherein the third conductive structure extends along the vertical direction, and wherein the third conductive structure, the first semiconductor film, and a second dielectric film therebetween forms a second capacitor.

2. The semiconductor device of claim 1, wherein the first conductive structure is in contact with a traversing, middle portion of the first semiconductor film, the second conductive structure is coupled to a first corner portion of the first semiconductor film with the first dielectric film interposed therebetween, and the third conductive structure is coupled to a second corner portion of the first semiconductor film with the second dielectric film interposed therebetween.

3. The semiconductor device of claim 1, wherein the second and third conductive structures are disposed on a side of the first conductive structure along a second lateral direction, the second lateral direction being perpendicular to the first lateral direction.

4. The semiconductor device of claim 1, further comprising:
 a second metal structure disposed on the second side of the gate dielectric layer, wherein the second metal structure also extends along the first lateral direction but is separated apart from the first metal structure along a second lateral direction, the second lateral direction being perpendicular to the first lateral direction.

5. The semiconductor device of claim 4, wherein the first conductive structure is disposed between the first and second metal structures along the second lateral direction.

6. The semiconductor device of claim 4, further comprising:
- a fourth conductive structure disposed on the first side over the first semiconductor film, wherein the fourth conductive structure extends along the vertical direction; and
- a fifth conductive structure disposed on the first side over the first semiconductor film, wherein the fifth conductive structure extends along the vertical direction.

7. The semiconductor device of claim 6, wherein the first conductive structure is in contact with a traversing, middle portion of the first semiconductor film, the fourth conductive structure is coupled to a third corner portion of the first semiconductor film with a third dielectric film interposed therebetween, and the fifth conductive structure is coupled to a fourth corner portion of the first semiconductor film with a fourth dielectric film interposed therebetween.

8. The semiconductor device of claim 6, wherein the second and third conductive structures are disposed on a first side of the first conductive structure along the second lateral direction, while the fourth and fifth conductive structures are disposed on a second, opposite side of the first conductive structure along the second lateral direction.

9. The semiconductor device of claim 6, further comprising:
- a second semiconductor film disposed on the first side of the gate dielectric layer;
- a third metal structure and fourth metal structure disposed on the second side of the gate dielectric layer, wherein the third and fourth metal structure each extend along the first lateral direction;
- a sixth conductive structure disposed on the first side over the second semiconductor film, wherein the sixth conductive structure extends along the first lateral direction to traverse across the second semiconductor film, and further extends along a vertical direction;
- a seventh conductive structure disposed on the first side over the second semiconductor film, wherein the seventh conductive structure extends along the vertical direction;
- an eighth conductive structure disposed on the first side over the second semiconductor film, wherein the eighth conductive structure extends along the vertical direction;
- a ninth conductive structure disposed on the second first side over the second semiconductor film, wherein the ninth conductive structure extends along the vertical direction; and
- a tenth conductive structure disposed on the first side over the second semiconductor film, wherein the tenth conductive structure extends along the vertical direction.

10. The semiconductor device of claim 9, wherein the sixth conductive structure is in contact with a traversing, middle portion of the second semiconductor film, the seventh conductive structure is coupled to a first corner portion of the second semiconductor film with the first dielectric film interposed therebetween, the eighth conductive structure is coupled to a second corner portion of the second semiconductor film with the second dielectric film interposed therebetween, the ninth conductive structure is coupled to a third corner portion of the second semiconductor film with a third dielectric film interposed therebetween, and the tenth conductive structure is coupled to a fourth corner portion of the second semiconductor film with an fourth dielectric film interposed therebetween.

11. The semiconductor device of claim 9, wherein the first and sixth conductive structures are electrically coupled to each other, wherein the second, fourth, seventh, and ninth conductive structures are electrically coupled to one another, and wherein the third, fifth, eighth, and tenth conductive structures are electrically coupled to one another.

12. A semiconductor device, comprising:
- a gate dielectric layer;
- a semiconductor film disposed on a first side of the gate dielectric layer;
- a gate terminal disposed on a second side of the gate dielectric layer opposite to the first side, wherein the gate terminal extends along a first lateral direction;
- a bit line disposed on the semiconductor film, extending along the first lateral direction to traverse across the semiconductor film, and further extending along a vertical direction;
- a first conductive terminal disposed on the first side of the semiconductor film, and extending along the vertical direction, wherein the first conductive terminal, the semiconductor film, and a first dielectric film therebetween forms a first capacitor; and
- a second conductive terminal disposed on the first side over the semiconductor film, and extending along the vertical direction, wherein the second conductive terminal, the semiconductor film, and a second dielectric film therebetween forms a second capacitor.

13. The semiconductor device of claim 12, wherein the gate terminal, the gate dielectric layer, and a portion of the semiconductor film serves as a gate structure.

14. The semiconductor device of claim 12, wherein the first conductive terminal is lined with the first dielectric film.

15. The semiconductor device of claim 12, wherein the second conductive terminal is lined with the second dielectric film.

16. A memory system, comprising:
- a memory array comprising a plurality of memory cells, each including:
- a gate dielectric layer;
- a semiconductor film disposed on a first side of the gate dielectric layer;
- a gate terminal disposed on a second side of the gate dielectric layer opposite to the first side, and extending along a first lateral direction;
- a bit line disposed on the semiconductor film, extending along the first lateral direction to traverse across the semiconductor film, and further extending along a vertical direction;
- a first conductive terminal disposed on the first side of the semiconductor film, and extending along the vertical direction, wherein the first conductive terminal, the semiconductor film, and a first dielectric film therebetween forms a first capacitor; and
- a second conductive terminal disposed on the first side over the semiconductor film, and extending along the vertical direction, wherein the second conductive terminal, the semiconductor film, and a second dielectric film therebetween forms a second capacitor; and
- an authentication circuit operatively coupled to the memory array.

17. The memory system of claim 16, wherein the gate terminal, the gate dielectric layer, and a portion of the semiconductor film serves as a transistor.

18. The memory system of claim 17, wherein the first conductive terminal is lined with the first dielectric film;
wherein the second conductive terminal is lined with the second dielectric film; and
wherein the transistor is coupled to the first capacitor and the second capacitor in series, respectively.

\* \* \* \* \*